(12) United States Patent
Graham

(10) Patent No.: US 7,954,056 B2
(45) Date of Patent: May 31, 2011

(54) TELEVISION-BASED VISUALIZATION AND NAVIGATION INTERFACE

(75) Inventor: Jamey Graham, San Jose, CA (US)

(73) Assignee: Ricoh Company, Ltd. (JP)

( * ) Notice: Subject to any disclaimer, the term of this patent is extended or adjusted under 35 U.S.C. 154(b) by 744 days.

(21) Appl. No.: 10/174,522

(22) Filed: Jun. 17, 2002

(65) Prior Publication Data

US 2003/0184598 A1    Oct. 2, 2003

Related U.S. Application Data

(63) Continuation-in-part of application No. 10/081,129, filed on Feb. 21, 2002, which is a continuation-in-part of application No. 08/995,616, filed on Dec. 22, 1997, now abandoned.

(51) Int. Cl.
*G06F 3/00* (2006.01)
(52) U.S. Cl. ........ 715/716; 715/810; 715/853; 715/719; 715/721; 715/836
(58) Field of Classification Search .................. 715/716, 715/810, 853, 719, 721, 836; 348/13, 906, 348/654
See application file for complete search history.

(56) References Cited

U.S. PATENT DOCUMENTS

| | | |
|---|---|---|
| 4,417,239 A | 11/1983 | Demke et al. |
| 4,481,412 A | 11/1984 | Fields |
| 4,807,186 A | 2/1989 | Ohnishi et al. |
| 4,823,303 A | 4/1989 | Terasawa |
| 4,881,135 A | 11/1989 | Heilweil |
| 5,153,831 A | 10/1992 | Yianilos |
| 5,250,787 A | 10/1993 | Arii et al. |
| 5,258,880 A | 11/1993 | Takahashi |
| 5,309,359 A | 5/1994 | Katz et al. |
| 5,339,391 A | 8/1994 | Wroblewski et al. |
| 5,349,658 A | 9/1994 | O'Rourke et al. |
| 5,382,776 A | 1/1995 | Arii et al. |
| 5,384,703 A | 1/1995 | Withgott et al. |
| 5,404,295 A | 4/1995 | Katz et al. |
| 5,418,948 A | 5/1995 | Turtle |
| 5,436,792 A | 7/1995 | Leman et al. |
| 5,442,795 A | 8/1995 | Levine et al. |
| 5,467,288 A | 11/1995 | Fasciano et al. |
| 5,479,600 A | 12/1995 | Wroblewski et al. |
| 5,481,666 A | 1/1996 | Nguyen et al. |
| 5,485,554 A | 1/1996 | Lowitz et al. |

(Continued)

FOREIGN PATENT DOCUMENTS

EP      248 403 A2    12/1987

(Continued)

OTHER PUBLICATIONS

"About Telus investors glossary," pp. 1-7 downloaded from http://about.telus.com/investors/glossary.html on Apr. 14, 2005.

(Continued)

*Primary Examiner* — Ba Huynh
*Assistant Examiner* — Mylinh Tran
(74) *Attorney, Agent, or Firm* — Kilpatrick Townsend & Stockton LLP

(57) ABSTRACT

Techniques for retrieving and displaying multimedia information are provided. A television (TV) interface is provided that displays multimedia information that may be stored in a multimedia document. The interface enables a user to navigate through multimedia information stored on the multimedia document.

59 Claims, 10 Drawing Sheets

U.S. PATENT DOCUMENTS

| | | |
|---|---|---|
| 5,568,406 A | 10/1996 | Gerber |
| 5,596,700 A | 1/1997 | Darnell et al. |
| 5,600,775 A | 2/1997 | King et al. |
| 5,633,723 A | 5/1997 | Sugiyama et al. |
| 5,638,543 A | 6/1997 | Pedersen et al. |
| 5,675,752 A | 10/1997 | Scott et al. |
| 5,680,636 A | 10/1997 | Levine et al. |
| 5,694,559 A | 12/1997 | Hobson et al. |
| 5,706,097 A | 1/1998 | Schelling et al. |
| 5,721,897 A | 2/1998 | Rubinstein et al. |
| 5,737,599 A | 4/1998 | Rowe et al. |
| 5,745,756 A | 4/1998 | Henley |
| 5,748,805 A | 5/1998 | Withgott et al. |
| 5,751,283 A | 5/1998 | Smith |
| 5,758,037 A | 5/1998 | Schroeder |
| 5,761,655 A | 6/1998 | Hoffman |
| 5,778,397 A | 7/1998 | Kupiec et al. |
| 5,781,785 A | 7/1998 | Rowe et al. |
| 5,784,616 A | 7/1998 | Horvitz |
| 5,790,114 A | 8/1998 | Geaghan et al. |
| 5,809,318 A | 9/1998 | Rivette et al. |
| 5,819,301 A | 10/1998 | Rowe et al. |
| 5,832,474 A | 11/1998 | Lopresti et al. |
| 5,838,317 A | 11/1998 | Bolnick et al. |
| 5,857,185 A | 1/1999 | Yamaura |
| 5,860,074 A | 1/1999 | Rowe et al. |
| 5,870,770 A | 2/1999 | Wolfe |
| 5,873,107 A | 2/1999 | Borovoy et al. |
| 5,892,536 A | 4/1999 | Logan et al. |
| 5,894,333 A | 4/1999 | Kanda et al. |
| 5,895,476 A | 4/1999 | Orr et al. |
| 5,898,166 A | 4/1999 | Fukuda et al. |
| 5,898,709 A | 4/1999 | Imade et al. |
| 5,933,829 A | 8/1999 | Durst et al. |
| 5,933,841 A | 8/1999 | Schumacher et al. |
| 5,943,679 A | 8/1999 | Niles et al. |
| 5,946,678 A | 8/1999 | Aalbersberg |
| 5,950,187 A | 9/1999 | Tsuda |
| 5,978,773 A | 11/1999 | Hudetz et al. |
| 5,986,692 A | 11/1999 | Logan et al. |
| 5,987,454 A | 11/1999 | Hobbs |
| 5,999,173 A | 12/1999 | Ubillos |
| 6,005,562 A * | 12/1999 | Shiga et al. ............... 715/721 |
| 6,006,218 A | 12/1999 | Breese et al. |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,061,758 A | 5/2000 | Reber et al. |
| 6,094,648 A | 7/2000 | Aalbersberg |
| RE36,801 E | 8/2000 | Logan et al. |
| 6,098,082 A | 8/2000 | Gibbon et al. |
| 6,101,503 A | 8/2000 | Cooper et al. |
| 6,108,656 A | 8/2000 | Durst et al. |
| 6,115,718 A | 9/2000 | Huberman et al. |
| 6,125,229 A | 9/2000 | Dimitrova et al. |
| 6,151,059 A * | 11/2000 | Schein et al. ............... 348/13 |
| 6,160,633 A | 12/2000 | Mori |
| 6,182,090 B1 | 1/2001 | Peairs |
| 6,193,658 B1 | 2/2001 | Wendelken et al. |
| 6,199,048 B1 | 3/2001 | Hudetz et al. |
| 6,211,869 B1 | 4/2001 | Loveman et al. |
| 6,222,532 B1 | 4/2001 | Ceccarelli |
| 6,262,724 B1 | 7/2001 | Crow et al. |
| 6,340,971 B1 | 1/2002 | Janse et al. |
| 6,369,811 B1 | 4/2002 | Graham et al. |
| 6,421,067 B1 * | 7/2002 | Kamen et al. ............... 715/719 |
| 6,430,554 B1 | 8/2002 | Rothschild |
| 6,434,561 B1 | 8/2002 | Durst, Jr. et al. |
| 6,452,615 B1 | 9/2002 | Chiu et al. |
| 6,505,153 B1 | 1/2003 | Van Thong et al. |
| 6,518,986 B1 * | 2/2003 | Mugura ............... 715/810 |
| 6,529,920 B1 | 3/2003 | Arons et al. |
| 6,535,639 B1 | 3/2003 | Uchihachi et al. |
| 6,542,933 B1 | 4/2003 | Durst, Jr. et al. |
| 6,546,385 B1 | 4/2003 | Mao et al. |
| 6,567,980 B1 * | 5/2003 | Jain et al. ............... 725/61 |
| 6,596,031 B1 | 7/2003 | Parks |
| 6,601,026 B2 | 7/2003 | Appelt et al. |
| 6,608,563 B2 | 8/2003 | Weston et al. |
| 6,623,528 B1 | 9/2003 | Squilla et al. |
| 6,628,303 B1 | 9/2003 | Foreman et al. |
| 6,636,869 B1 | 10/2003 | Reber et al. |
| 6,647,535 B1 | 11/2003 | Bozdagi et al. |
| 6,651,053 B1 | 11/2003 | Rothschild |
| 6,675,165 B1 | 1/2004 | Rothschild |
| 6,684,368 B1 | 1/2004 | Hull et al. |
| 6,745,234 B1 | 6/2004 | Philyaw et al. |
| 6,750,978 B1 | 6/2004 | Marggraff et al. |
| 6,760,541 B1 | 7/2004 | Ohba |
| 6,766,363 B1 | 7/2004 | Rothschild |
| 6,781,609 B1 | 8/2004 | Barker et al. |
| 6,789,228 B1 | 9/2004 | Merril et al. |
| 6,865,608 B2 | 3/2005 | Hunter |
| 6,865,714 B1 | 3/2005 | Liu et al. |
| 6,993,573 B2 | 1/2006 | Hunter |
| 7,131,058 B1 | 10/2006 | Lapstun et al. |
| 7,304,662 B1 | 12/2007 | Sullivan et al. |
| 7,319,964 B1 | 1/2008 | Huang et al. |
| 7,495,795 B2 | 2/2009 | Graham |
| 7,540,011 B2 | 5/2009 | Wixson et al. |
| 7,596,755 B2 | 9/2009 | Graham |
| 2001/0005203 A1 | 6/2001 | Wiernik |
| 2001/0013041 A1 | 8/2001 | Beck et al. |
| 2001/0037408 A1 | 11/2001 | Thrift et al. |
| 2001/0043789 A1 | 11/2001 | Nishimura et al. |
| 2001/0044810 A1 | 11/2001 | Timmons |
| 2002/0010641 A1 | 1/2002 | Stevens et al. |
| 2002/0036800 A1 | 3/2002 | Nozaki |
| 2002/0047870 A1 | 4/2002 | Carro |
| 2002/0048224 A1 | 4/2002 | Dygert et al. |
| 2002/0059342 A1 | 5/2002 | Gupta et al. |
| 2002/0065814 A1 | 5/2002 | Okamoto et al. |
| 2002/0070982 A1 | 6/2002 | Hill et al. |
| 2002/0095460 A1 | 7/2002 | Benson |
| 2002/0099452 A1 | 7/2002 | Kawai |
| 2002/0116575 A1 | 8/2002 | Toyomura et al. |
| 2002/0135808 A1 | 9/2002 | Parry |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0007776 A1 | 1/2003 | Kameyama et al. |
| 2003/0025599 A1 * | 2/2003 | Monroe ............... 340/531 |
| 2003/0052897 A1 | 3/2003 | Lin |
| 2003/0065665 A1 | 4/2003 | Kinjo |
| 2003/0090505 A1 * | 5/2003 | McGee et al. ............... 345/721 |
| 2003/0117652 A1 | 6/2003 | Lapstun |
| 2003/0156589 A1 | 8/2003 | Suetsugu |
| 2003/0164844 A1 | 9/2003 | Kravitz et al. |
| 2003/0189588 A1 * | 10/2003 | Girgensohn et al. ............... 345/723 |
| 2003/0220988 A1 | 11/2003 | Hymel |
| 2003/0234803 A1 * | 12/2003 | Toyama et al. ............... 345/716 |
| 2004/0006577 A1 | 1/2004 | Rix |
| 2004/0008209 A1 | 1/2004 | Adams et al. |
| 2004/0015524 A1 | 1/2004 | Chalstrom et al. |
| 2004/0037540 A1 | 2/2004 | Frohlich et al. |
| 2004/0064338 A1 | 4/2004 | Shiota et al. |
| 2004/0064339 A1 | 4/2004 | Shiota et al. |
| 2004/0071441 A1 | 4/2004 | Foreman et al. |
| 2004/0090462 A1 | 5/2004 | Graham |
| 2004/0095376 A1 | 5/2004 | Graham et al. |
| 2004/0098671 A1 | 5/2004 | Graham et al. |
| 2004/0100506 A1 | 5/2004 | Shiota et al. |
| 2004/0103372 A1 | 5/2004 | Graham |
| 2004/0119819 A1 * | 6/2004 | Aggarwal et al. ............... 348/143 |
| 2004/0143602 A1 | 7/2004 | Ruiz et al. |
| 2004/0175036 A1 | 9/2004 | Graham |
| 2004/0187167 A1 | 9/2004 | Maguire et al. |
| 2004/0247298 A1 | 12/2004 | Ohba |
| 2004/0249650 A1 | 12/2004 | Freedman et al. |
| 2005/0064935 A1 | 3/2005 | Blanco |
| 2007/0033419 A1 | 2/2007 | Kocher et al. |
| 2008/0106597 A1 * | 5/2008 | Amini et al. ............... 348/143 |

FOREIGN PATENT DOCUMENTS

| | | |
|---|---|---|
| EP | 378 848 A2 | 7/1990 |
| EP | 459 174 A2 | 12/1991 |
| EP | 762 297 A2 | 3/1997 |
| EP | 788 063 A2 | 6/1997 |
| EP | 788 064 A2 | 6/1997 |
| EP | 802 492 A1 | 10/1997 |
| EP | 737 927 A2 | 10/1998 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 04-021165 A | 1/1992 |
| JP | 05-081327 A | 4/1993 |
| JP | 8-297677 A | 11/1996 |
| JP | 2000-253337 A | 9/2000 |
| JP | 2000-516006 A | 11/2000 |
| JP | 2001-111963 A | 4/2001 |
| JP | 2001-176246 A | 6/2001 |
| JP | 2001-326910 A | 11/2001 |
| JP | 2002-158936 A | 5/2002 |
| JP | 2004-023787 A | 1/2004 |
| JP | 2004-199696 A | 7/2004 |

OTHER PUBLICATIONS

Acrobat Reader Version 2.0 (software application), Adobe Systems Incorporated, screenshots Figures 1-10 (1994).

Adobe Premiere (video editing software) from Http://www.adobe.com (2002).

Adobe Acrobat Reader 3.0 screen dumps (fig. 1-3), (1996).

Adobe Systems, Inc., "Adobe Photoshop 4.0 User Guide for Macintosh and Windows," 1996, Title Page. Copyright Page, Chap. 2, pp. 30-31.

Apple Macintosh system 7 reference manual, pp. 30-31 (1991).

Ball, Thomas, and Eick, Stephen G., "Software Visualization in the Large," IEEE Computer, vol. 29. No. 4, Apr. 1996, pp. 33-43, http://www.computer.org/computer/co1996/r4033abs.htm.

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Bobick et al. "A State Based Approach to the Representation and Recognition of Gesture," IEEE Trans. on Pattern Analysis and Machine Intelligence, pp. 1325-1337 (1997).

Boguraev et al. "Salience-based Content Characterization of Text Documents," In Proceedings of Workshop on Intelligent Scalable Text Summarization at the ACL/EACL Conference, Madrid, Spain, 12 pages (Jul. 7-12, 1997).

Boreczky, J. et al. "An Interactive Comic Book Presentation for Exploring Video," Conference on Human factors in Computing Sytems (CHI 2000), ACM Press, pp. 185-192, 2000.

Boykin et al, "Improving Broadcast News Segmentation Processing," IEEE Multimedia '99 (1999).

Boykin et al. "Machine learning of Event Segmentation for News on Demand," Communications of the ACM, 43:35-41(2000).

Brandow et al., "Automatic Condensation of Electronic Publications by Sentence Selection," *Information Processing and Management*, 31(5):675-685 (1995).

Brown et al. "Automatic Content-Based Retrieval of Broadcast News," ACM Multimedia 5, San Francisco, CA (1995).

Byrd, D., "A Scrollbar-based Visualization for Document Navigation," doc. ID: xxx.cs.IR/9902028, Computing Research Repository: Information Retrieval (1999).

Chen et al. "Emotion Recognition from Audiovisual Information," Proc. IEEE Workshop on Multimedia Signal Processing, Los Angeles, CA, USA, pp. 83-88 (1998).

Chen et al. "ViBE: A Video Indexing and Browsing Environment," Proceedings of the SPIE Conference on Multimedia Storage and Archiving Systems Sep. 20-22, 1999, Boston 3846:148-164 (1999).

Chiu et al. "NoteLook: Taking Notes in Meetings with Digital Video and Ink," ACM Multimedia 99 Orlando, (1999).

Chiu et al. "Automatically linking multimedia meeting documents by image matching," Proceedings of Hypertext '00. ACM, New York, pp. 244-245 (2000).

Choi et al., "An Integrated Data Model and a Query Language for Content-Based Retrieval of Video," *MIS '98 LNCS* 1508, Springer Verlag Berlin Heidelberg, pp. 192-198 (1998).

Christel et al. "Evolving Video Skims into Useful Multimedia Abstractions," Proceedings of the CHI '98 Conference on Human Factors in Computing Systems (Los Angeles, CA, Apr. 1998), pp. 171-178 (1998).

Christel et al. "Information Visualization within a Digital Video Library," Journal of Intelligent Information Systems 11:35-257 (1998).

Office Action of Dec. 4, 2007 in Japanese application 2003-158077.

"Computer Terms," pp. 1-8 downloaded from http:www.parkmeadow.org/computer_terms.htm on Apr. 14, 2005.

Dellaert et al. "Recognizing emotion in speech," Proceedings ICSLP 96. Fourth International Conference on Spoken Language Processing New York (Cat. No. 96TH8206). IEEE. vol. 1970-1973 (1996).

Dimitrova et al. "Video Keyframe Extraction and Filtering: A Keyframe is not a Keyframe to Everyone," CIKM 1997:113-120 (1997).

Doermann et al. "Applying Algebraic and differential invarients for logo recognition," Machine Vision and Applications 9:73-86 (1996).

Donato et al. "Classifying Facial Actions", IEEE Trans. on Pattern Analysis and Machine Intelligence, 21:974-989 (1999).

Drucker et al. "SmartSkip: Consumer Level Browsing and Skipping of Digital Video Content," Paper: Technology to Help People Find Information, vol. No. 4, Issue No. 1, pp. 219-226, Minneapolis, Minnesota, USA, (Apr. 20-25, 2002).

Essa et al. Coding Analysis Interpretation and Recognition of Facial Expressions, IEEE Trans. on Pattern Analysis and Machine Intelligence, 19:757-763 (1997).

Face recognition techniques described at web site http:/www.vision-ics.com (2002).

"Flexible JAMM Screenshots," downloaded from internet site http://simon.cs.ct.edu/-jamm May 4, 2000.

Foote, Jonathan, et al. "An Intelligent Media Browser using Automatic Multimodal Analysis," ACM Multimedia 8, Bristol, UK (1998).

"Fujitsu Markets Facsimile Connection System for Computer I/O," *Comline Telecommunications*, Nov. 1989, p. 5.

Furui et al. "Japanese Broadcast News Transcription and Information Extraction," Communications of the ACM, 43(2):71-73, Feb. 2000.

Gauvain et al. "Transcribing Broadcast News for Audio and Video Indexing," Communications of the ACM, 43:64-70 (2000).

Gibbon "Generating Hypermedia Documents from Transcriptions of Television Programs Using Parallel Text Alignment," *Handbook of Internet and Multimedia Systems and Applications*, David C. Gibbon; CRC Press, (1998).

"Glossary for computer hardware and micro scope," pp. 1-11 downloaded from http://www.mumbaicyber.com/glossary_com_hardware_micro.asp on Apr. 14, 2005.

"Glossary: What Does It Mean?," pp. 1-3 downloaded from http://www.fairfield.k12.ct.us/fairfieldhs/cfairfieldhs03/glossary.htm on Apr. 14, 2005.

Gliedman, J., "Virtual Office Managers," *Computer Shopper*, 18(9):290 (1998).

Gordon "Using annotated video as an information retrieval interface," ACM Proceedings of the 5th international Conference on Intelligent User Interfaces New Orleans pp. 133-140 (2000).

Greenberg, et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Grunin, L., "Action," *PC Magazine*, 12(15):240 (1993).

"Hang on—Blue Sky's WinHelp is on the way," *PC Week*, p. 59, Jul. 1995.

Hauptmann et al. "Story Segmentation and Detection of Commercials in Broadcast News Video," Advances in Digital Libraries Conference, Santa Barbara, CA, Apr. 22-23, 1998.

Hauptmann et al. "Text, speech and vision for video segmentation: the informedia project." Proc. AAAI Fall Symp. Computational Models for Integrating Language and Vision, Boston. MA, Nov. 10-12, 1995.

He et al. "Comparing Presentation Summaries: Slides vs. Reading vs. Listening," Conference on Human factors in Computing Systems (CHI 2000), Apr. 1-6, 2000.

Hearst et al., "TileBars: Visualization of Term Distribution Information in Full Text Information Access," *Proceedings of the ACM SIGCHI Conference on Human Factors in Computing Systems (CHI)*, Denver, CO., May 1995, pp. 1-8, http://www.acm.org/sigchi/chi95/Electronic/documnts/papers/mah bdy htm.

Hecht "Embedded data glyph Technology for Hardcopy Digital Documents," Proc. SPIE 2171:341-352 (1994).

Hecht "Printed Embedded Data Graphical User Interfaces," IEEE Computer, Mar. 2001.

Hill et al. "Edit Wear and Read Wear," Computer Graphics and Interactive Media Research Group, pp. 3-9, (May 1992).

Hu et al. "Multimedia Description Framework (MDF) for content descriptions of Audio/Video Documents," Fourth ACM Conference on Digital Libraries (DL '99) Aug. 11-14, 1999.

"IBM, Partners Team on Web-Based Image Search, Printing Sep. 29, 1995," Newsbytes News Network, Sep. 1995.

IBM Technical Disclosure Bulletin, "Quick Selection of Window Environment Coordinates," 35:57-60, ISS # 4B, (1992).

Identitech, "Identitech announces FYI 2.5.2 release with NT object server, SmartForm, and ODBC," Business Editors, Jul. 1996.

"Identitech Unysis: Unysis wins Florida Housing Finance Agency Contract; Identitech provides workflow software solution," Business Editors/Computer Writers, Jun. 1995.

IOFFE et al. "Finding people by sampling," Proc. International Conference on Computer Vision, pp. 1092-1097 (1999).

"IT&T Talk", pp. 1-4 dopwnloaded from http://www.iib.qld.gov.au/itcareers/talk.asp on Apr. 14, 2005.

Jin et al. "Topic Tracking for Radio, TV Broadcast, and Newswire," Proceedings of the DARPA Broadcast News Workshop, Feb. 28-Mar. 3, 1999, Herndon. VA.

Komlodi et al. "Key Frame Preview Techniques for Video Browsing," (Proceedings of the 3rd ACM International Conference on Digital Libraries, Jun. 23-26, 1998, Pittsburgh, pp. 118-125 (1998).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Li et al. "Automatic Text Detection and Tracking in Digital Video," IEEE Transactions on Image Processing—Special Issue on Image and Video Processing for Digital Libraries, 9:147-156 (2000).

Li et al. "Text Extraction and Recognition in Digital Video," Proceedings of Third IAPR Workshop on Document Analysis Systems, pp. 119-128, 1998.

Li et al. "Vision: a digital video library," Proceedings of the 1st ACM International Conference on Digital Libraries, pp. 19-27, 1996.

Liang et al. "Practical video indexing and retrieval system," *SPIE*, 3240:294-303 (1988).

Lienhart et al. "On the Detection and Recognition of Television Commercials," Proc. IEEE Conf. on Multimedia Computing and Systems, Ottawa, Canada, pp. 509-516, Jun. 1997.

Lison et al., "Sight and Sound," *Unix Review*, 7(10):76-86 (1989).

Ma et al. "An Indexing and Browsing System for Home Video," Invited paper, EUSIPCO '2000. 10th European Signal Processing Conference. Sep. 5-8, 2000, Tampere, Finland.

Manber, U., "The Use of Customized Emphasis in Text Visualization," *Proceedings of 1997 IEEE Conf. on Information Visualization*, pp. 132-138, held Aug. 27-29, 1997 in London England.

Maybury "News on Demand," Communications of the ACM, 43:33-34 (2000).

Maybury et al. "Multimedia Summaries of Broadcast News," International Conference on Intelligent Information Systems pp. 447-449 (1997).

Maybury et al. "Multimedia Summaries of Broadcast News," International Conference on Intelligent Information Systems, Dec. 8-10, 1997.

Maybury et al. "Segmentation, Content Extraction and Visualization of Broadcast News Video Using Multistream Analysis," AAAI Paper (1997).

Merialdo et al. "Automatic Construction of Personalized TV News Programs," Seventh ACM International Multimedia Conference, Orlando Nov. 1999.

Merlino et al. "Broadcast News Navigation using Story Segmentation," Advanced Information Systems Center, The MITRE Corporation (1997).

Merlino et al. "Broadcast News Processing Techniques," MITRE Technical Report, MTR 99B0000031, Apr. 1999.

Mohan "Text-based search of TV news stories," Proc. SPIE 2916:2-13 (1996).

"Multimedia" pp. 1-2 downloaded from http://en.wikipedia.org/wiki/Multimedia on Apr. 14, 2005.

Myers et al. "Multi-View Intelligent Editor for Digital Video Libraries," First ACM and IEEE Joint Conference on Digital Libraries. Jun. 24-28. 2001, Roanoke, VA, pp. 106-115.

Oh et al. "Efficient and Cost-effective Techniques for Browsing and Indexing Large Video Databases," SIGMOD Conference 2000: 415-426.

Ohmori, Y., "A Tool for Programmable Access to Organized Multimedia Data—Enhanced MultiMedia Recorder (EMMR)," *Joho Shori Gakkai Kenkyu Hokoku*, 98(35[HI-78]):39-44 (1998).

Okada et al., "Development of Application Programs for Distributed Processing Equipment," *Review of the Electrical Communication Laboratories*, 34(4):465-471 (1986).

Phillips, R. L., "MediaView: A General Multimedia Digital Publication System," *Communications of the ACM*, 34(7):75-83 (1991).

Photina et al. "Improving acoustic models with captioned multimedia speech," Proceedings IEEE International Conference on Multimedia Computing and Systems, 2:767-71 (1999).

Roschelle et al., "VideoNoter: A productivity too for video data analysis," *Behavior Research Methods, Instruments & Computers*, 23(2):219-224 (1991).

Rowley et al. "Neural network-based face detection," IEEE Transactions on Pattern Analysis and Machine Intelligence, 20:23-38 (1998).

Saur et al., "Automated Analysis and Annotation of Basketball Video," *SPIE*, 3022:176-187 (1997).

Schweighofer et al., "The Automatic Generation of Hypertext Links in Legal Documents," *Lecture Notes in Computer Science*, vol. 1134, Wagner et al., eds., from 7th Int. Conf., DEXA 96', held Sep. 1996 in Zurich, Switzerland (1996).

Shahraray et al. "Automatic generation of pictorial transcripts of video programs." Proceedings of the SPIE- Int. Soc. Opt. Eng. 2417:512-518 (1995).

Shahraray et al. "Pictorial transcripts: multimedia processing applied to digital library creation," 1997 IEEE First Workshop on Multimedia Signal Processing pp. 581-586 (1997).

Shahraray et al. "Automated Authoring of Hypermedia Documents of Video Programs," *ACM Multimedia* 95, Nov. 5-9, 1995, San Francisco, CA (1995).

Product Brochure, Shutterfly, downloaded from http://www.shutterfly.com on Mar. 15, 2005 (10 pages).

Smith et al. "Video Skimming and Characterization through the Combination of Image and Language Understanding," Computer Vision and Pattern Recognition IEEE 1997.

Sodergard et al., "Integrated multimedia publishing—combining TV and newspaper content on personal channels," downloaded from http:www8.org/w8-papers/1b-multimedia/integrated/integrated. html on Apr. 4, 2002, pp. 1-22.

Sonmez et al. "Multiple speaker tracking and detection: handset normalization and duration scoring," Digital Signal Processing 10:133-143 (2000).

"Spry Inc.'s Internet Front End Picked for PSI Cable Internet Service," *Information & Interactive Services Report*, 15(7), (1994).

Strattner, A., "HP pioneers I-TV peripheral market," *Computer Shopper*, 14(2):71 (1994).
Suda et al. "Logo and word matching using a general approach to signal registration." Fourth International Conference on Document Analysis and Recognition, Ulm, Germany, Aug. 18-20, 1997, pp. 61-65.
Sumita et al., "Document Structure Extraction for Interactive Document Retrieval Systems," *Proceedings of SIGDOC 93*, pp. 301-310, held May 5-8, 1993 in Kitchner, Ontario.
Taghva et al., "Evaluation of an automatic markup system," Proceedings SPIE vol. 2422, , Document Recognition II, pp. 317-327 (Mar. 1995).
Taxt, T., "Segmentation of Document Images," *IEEE*, 11(12):1322-1329 (1989).
Tennenhouse et al. "A software-oriented approach to the design of media processing environments," Proceedings of the IEEE International Conference on Multimedia Computing and Systems, pp. 435-444 (1994).
Tonomura et al. "VideoMAP and VideoSpaceIcon : tools for anatomizing video content," Proc. INTERCHI '93 ACM pp. 131-136 (1993).
Uchihashi et al. "Summarizing Video Using a Shot Importance Measure and a Frame-Packing Algorithm," Proceedings of the International Conference on Acoustics, Speech, and Signal Processing (Phoenix, AZ) 6:3041-3044 (1999).
Uchihashi et al. "Video Manga: Generating Semantically Meaningful Video Summaries," *ACM Multimedia* 99, Orlando, Florida, Oct. 30-Nov. 5, 1999.
Van Horn-Christopher, "Have you talked to your computer today?," *Business Forum*, 19(3):10-11 (1994).
Video content management and publishing software from Virage http://www.virage.com (2002).
"Video Mail Retrieval Using Voice" Cambridge University Engineering Department Computer Laboratory and Olivetti Research Laboratory summary of research found at http://svr-www.eng.cam.ac.uk/research/projects/vmr/ (1997).
"VNR firm offers Storyboards" PR News, Dec. 4, 1995, downloaded from http://proquest.umi.com/pqdlink?index=20&did=000000010830394&SrchMode=3&sid=1&F on Aug. 9, 2004.
"WC3 issued first public draft of Synchronized Multimedia Integration Language (SMIL)," *Information Today*, 15(2):27 (1998) downloaded on May 28, 2004.
Wactlar et al. "Complementary Video and Audio Analysis for Broadcast News Archives." Communications of the ACM, 43:42-47 (2000).
Wactler et al. "Intelligent access to digital video: Informedia project." Computer 29:46-52 (1996).
Web pages from PaperClick.com printed from http://www.paperclip.com on Jun. 14, 2006.
Weiss et al. "Composition and Search with a Video Algebra," IEEE Multimedia 2:12-25 (1995).
Wittenburg et al. "Browsing with Dynamic Key Frame Collages in Web-Based Entertainment Video Services," In Proceedings of IEEE International Conference on Multimedia Computing Systems, Jun. 7-11, 1999, Florence, Italy 2:913-918 (1999).
"c:\... \9149920c.wpd—unmodified" Screen Shots of document created in Corel WordPerfect, 4 pages, (Apr. 30, 2002).
Product Brochure, YesVideo, downloaded from http://www.yesvideo.com/code on Mar. 15, 2005 (20 pages).
Zhang et al. "Detection of text Captions in Compressed domain Video," International Multimedia Conference Proceedings of the 2000 ACM workshops on Multimedia 2000 , Los Angeles. California, United States pp. 201-204.
Communication Pursuant to Article 96(2) EPC, European Application No. 04255836.1, Jun. 11, 2007, 10 pages.
Stifelman, L. et al., "The Audio Notebook," SIGCHI 2001, Mar. 31-Apr. 5, 2001, pp. 182-189, vol. 3, No. 1, Seattle, WA.
Communication mailed Aug. 14, 2007, received from the Japanese Patent Office in Japanese Application 11-195547.
Office Action of Jun. 10, 2008 in Japanese Application No. JP 2003-158077.
Non-Final Office Action for U.S. Appl. No. 10/081,129, mailed on Jan. 5, 2006, 36 pages.
Non-Final Office Action for U.S. Appl. No. 10/081,129, mailed on Aug. 9, 2006, 17 pages.
Final Office Action for U.S. Appl. No. 10/081,129, mailed on Apr. 20, 2007, 19 pages.
Advisory Action for U.S. Appl. No. 10/081,129, mailed on Jul. 2, 2007, 4 pages.
Non-Final Office Action for U.S. Appl. No. 10/081,129, mailed on Apr. 28, 2008, 27 pages.
Final Office Action for U.S. Appl. No. 10/081,129, mailed on Dec. 29, 2008, 40 pages.
Notice of Allowance for U.S. Appl. No. 10/081,129, mailed on Apr. 8, 2009, 7 pages.
Non-Final Office Action for U.S. Appl. No. 10/465,022, mailed on Dec. 12, 2006, 28 pages.
Final Office Action for U.S. Appl. No. 10/465,022, mailed on Aug. 21, 2007, 13 pages.
Non-Final Office Action for U.S. Appl. No. 10/465,022, mailed on Jan. 11, 2008, 16 pages.
Final Office Action for U.S. Appl. No. 10/465,022, mailed on Oct. 7, 2008, 26 pages.
Non-Final Office Action for U.S. Appl. No. 10/465,022, mailed on Jun. 25, 2009, 14 pages.
Non-Final Office Action for U.S. Appl. No. 10/465,022, mailed on Feb. 17, 2010, 14 pages.
Final Office Action for U.S. Appl. No. 10/465,022, mailed on Aug. 10, 2010, 23 pages.
Requirement for Restriction/Election for U.S. Appl. No. 10/465,027, mailed on Jun. 21, 2007, 5 pages.
Non-Final Office Action for U.S. Appl. No. 10/465,027, mailed on Oct. 17, 2007, 33 pages.
Final Office Action for U.S. Appl. No. 10/465,027, mailed on Jun. 19, 2008, 34 pages.
Notice of Allowance for U.S. Appl. No. 10/465,027, mailed on Nov. 13, 2008, 11 pages.
Non-Final Office Action for U.S. Appl. No. 10/701,966, mailed on Apr. 5, 2007, 27 pages.
Final Office Action for U.S. Appl. No. 10/701,966, mailed on Nov. 16, 2007, 20 pages.
Non-Final Office Action for U.S. Appl. No. 10/701,966, mailed on Apr. 30, 2008, 14 pages.
Final Office Action for U.S. Appl. No. 10/701,966, mailed on Sep. 4, 2008, 58 pages.
Non-Final Office Action for U.S. Appl. No. 10/701,966, mailed on Mar. 3, 2009, 10 pages.
Final Office Action for U.S. Appl. No. 10/701,966, mailed on Jan. 15, 2010, 22 pages.
Non-Final Office Action for U.S. Appl. No. 10/795,031, mailed on Apr. 6, 2007, 28 pages.
Final Office Action for U.S. Appl. No. 10/795,031, mailed on Dec. 13, 2007, 19 pages.
Advisory Action for U.S. Appl. No. 10/795,031, mailed on May 19, 2008, 3 pages.
Non-Final Office Action for U.S. Appl. No. 10/795,031, mailed on Sep. 8, 2008, 56 pages.
Final Office Action for U.S. Appl. No. 10/795,031, mailed on Feb. 3, 2009, 17 pages.
Non-Final Office Action for U.S. Appl. No. 10/795,031, mailed on Dec. 10, 2009, 11 pages.
Final Office Action for U.S. Appl. No. 10/795,031, mailed on Jun. 9, 2010, 17 pages.

* cited by examiner

TELEVISION-BASED VISUALIZATION AND NAVIGATION INTERFACE

CROSS-REFERENCES TO RELATED APPLICATIONS

This application is a continuation-in-part of and claims the benefit of U.S. patent application Ser. No. 10/081,129, filed Feb. 21, 2002, entitled "Multimedia Visualization & Integration Environment (MuVIE)", which in turn claims priority from and is a continuation-in-part (CIP) application of U.S. Non-Provisional patent application Ser. No. 08/995,616, entitled "AUTOMATIC ADAPTIVE DOCUMENT READING HELP SYSTEM" filed Dec. 22, 1997, the entire contents of which are incorporated herein by reference for all purposes.

This application makes reference to the following commonly owned patent application, the entire contents of which are incorporated herein by reference for all purposes:

U.S. patent application Ser. No. 10/001,895, filed on Nov. 19, 2001, entitled, "Paper-Based Interface for Multimedia Information".

BACKGROUND OF THE INVENTION

The present invention generally relates to displaying information on a television interface and more particularly to techniques for displaying a user interface on a television that facilitates navigation of multimedia information displayed by the television.

The advent of appliances that are capable of displaying stored multimedia information via a television (TV) interface has dramatically changed a user's television viewing experience. Examples of such appliances include digital video recorders (DVRs), digital video disc (DVD) players, and the like. A DVR is a device that is capable of recording TV broadcasts for replay at a later time. During playback of the recorded TV broadcast, the user can pause, fast forward, rewind, or perform other operations on the recorded TV broadcast information similar to operations that can be performed by a video cassette recorder (VCR) system.

A DVR is generally a data processing system that includes a storage subsystem (e.g., a hard drive) for storing recorded TV broadcasts. The DVR is capable of recording one or more TV broadcasts during time intervals that may be specified by the user. DVRs generally also provide a user interface for navigating and controlling playback of the recorded TV broadcast information. The user interface is designed to be controlled with a TV remote control device.

Various user interfaces have been designed that are displayed on a TV and enable a user to control and navigate the playback of recorded multimedia information (which may include recorded TV broadcast information) that is output via the TV. In one example, a television interface includes a time bar that is displayed alongside the multimedia information that is being replayed by the TV. The time bar indicates the total length of the multimedia recording and the time elapsed during playback of the multimedia information. Markers are also included on the bar representing time points in the multimedia information to which a user can "jump". A user may use a remote control to "jump" to the time points in the video corresponding to the markers. In conventional interfaces, the markers simply represent precon-figured time points in the multimedia information and are not determined with reference to the content of the recorded multimedia information. For example, the markers may correspond to the one-quarter, one-half, and three-quarters time intervals in the multimedia information. Also, these markers are not user configurable and do not show the content of the multimedia information. Further, the markers are displayed just as lines on the time bar and do not show any information related to the contents of the multimedia information. Additionally, navigation through the recorded multimedia information is restricted to the pre-defined markers—the time bar does not allow random access to sections of the recorded multimedia information that do not correspond to the markers.

A digital video disc (DVD) player generally allows a user to control playback and navigation of multimedia information stored on a DVD using predefined scenes. The user is presented a screen with a selection of scenes that include a picture associated with the scene. The user can select a scene to begin playback and the DVD begins playback of the multimedia information starting from the selected scene. The scene selection screen is not shown during the playback of the multimedia information. Thus, the DVD interface does not allow interactive navigation during playback of the multimedia information stored on a DVD. Once a user selects a scene, the multimedia information corresponding to the selected scene is played back on the TV. During playback, the user is not allowed to view the scene selection screen and navigate to other sections of the multimedia information. Further, the user is limited to navigating between the predefined scenes.

BRIEF SUMMARY OF THE INVENTION

The present invention provides techniques for retrieving and displaying multimedia information. According to an embodiment of the present invention, a television (TV) interface is provided that displays multimedia information that may be stored in a multimedia document. According to teachings of embodiments of the present invention, the interface enables a user to navigate through multimedia information stored on the multimedia document.

In one embodiment, techniques for displaying multimedia information on a television display are provided. The embodiment is configured to display a section of the multimedia information in a first area of the display. Additionally, the embodiment is configured to display a navigation bar in a second area of the display. The navigation bar includes one or more thumbnail images, wherein each thumbnail image in the one or more thumbnail images is extracted from the multimedia information. Also, at least one thumbnail image in the one or more of thumbnail images is selectable while the section of multimedia information in the first area of the display is displayed.

In another embodiment, techniques for displaying multimedia information on a television display are provided. The embodiment is configured to display a section of the multimedia information in a first area of the display. Also, a second area of the display in which a navigation bar will be displayed is identified. The embodiment then determines one or more timestamps based on the second area of the display. A keyframe from the multimedia information corresponding to each timestamp is extracted. The navigation bar is then configured to include a keyframe extracted for at least one timestamp in the one or more time stamps. The navigation bar is then displayed in the second area of the display. In the navigation bar, at least one keyframe is included that is selectable by a user during display of the section of the multimedia information in the first area of the display.

In yet another embodiment, a data processing system is provided. The data processing system includes a processor and a memory coupled to the processor. The memory is configured to store one or more code modules for execution by the processor, where the one or more code modules are configured to perform techniques for displaying multimedia information in a television display as described.

In yet another embodiment, a computer program product for displaying multimedia information on a television display is provided. The computer program product includes code for executing techniques for displaying multimedia information in a television display as described.

In one embodiment, a TV remote control is provided to select thumbnail images displayed in the navigation bar.

A further understanding of the nature and advantages of the invention herein may be realized by reference of the remaining portions in the specifications and the attached drawings.

DETAILED DESCRIPTION OF THE INVENTION

Embodiments of the present invention provide a navigation bar that is displayed on a television (TV) and allows control and navigation of multimedia information outputted on the TV. According to an embodiment of the present invention, a television user interface is provided that displays multimedia information that may be stored in a multimedia document. According to the teachings of embodiments of the present invention, the interface enables a user to navigate through multimedia information stored in a multimedia document. The interface provides both a focused and a contextual view of the contents of the multimedia document displayed by the TV.

As indicated above, the term "multimedia information" is intended to refer to information that comprises information of several different types in an integrated form. The different types of information included in multimedia information may include a combination of text information, graphics information, animation information, sound (audio) information, video information, slides information, whiteboard images information, and other types of information. For example, a video recording of a television broadcast may comprise video information and audio information. In certain instances the video recording may also comprise close-captioned (CC) text information, which comprises material related to the video information, and in many cases, is an exact representation of the speech contained in the audio portions of the video recording. Multimedia information is also used to refer to information comprising one or more objects wherein the objects include information of different types. For example, multimedia objects included in multimedia information may comprise text information, graphics information, animation information, sound (audio) information, video information, slides information, whiteboard images information, and other types of information.

The term "multimedia document" as used in this application is intended to refer to any electronic storage unit (e.g., a file) that stores multimedia information in a digital format. Various different formats may be used to store the multimedia information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others. Examples of multimedia documents include video recordings, MPEG files, news broadcast recordings, presentation recordings, recorded meetings, classroom lecture recordings, broadcast television programs, or the like.

Figure 1:
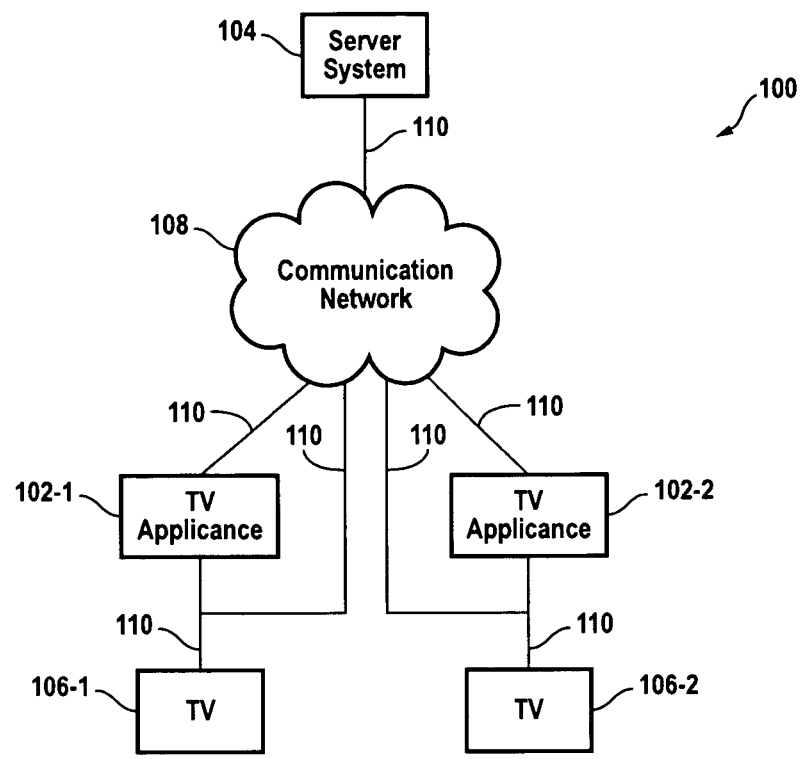
FIG. 1 is a simplified block diagram of a distributed network that may incorporate an embodiment of the present invention.

FIG. 1 is a simplified block diagram of a distributed network 100 that may incorporate an embodiment of the present invention. As depicted in FIG. 1, distributed network 100 comprises a number of systems including one or more TV appliances 102, one or more television systems 106, and a server system 104 coupled to communication network 108 via a plurality of communication links 110. Distributed network 100 depicted in FIG. 1 is merely illustrative of an embodiment incorporating the present invention and does not limit the scope of the invention as recited in the claims. One of ordinary skill in the art would recognize other variations, modifications, and alternatives. For example, the present invention may also be embodied in a stand-alone system. In a stand-alone environment, the functions performed by the various systems depicted in FIG. 1 may be performed by a single system.

Communication network 108 provides a mechanism allowing the various systems depicted in FIG. 1 to communicate and exchange information with each other. Communication network 108 may itself be comprised of many interconnected computer systems and communication links. While in one embodiment, communication network 108 is the Internet, in other embodiments, communication network 108 may be any suitable communication network including a local area network (LAN), a wide area network (WAN), a wireless network, an intranet, a private network, a public network, a switched network, or the like.

Communication links 110 used to connect the various systems depicted in FIG. 1 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Accordingly, according to an embodiment of the present invention, server system 104, TV appliance 102, and/or any combination thereof are configured to perform processing to facilitate generation of an interface that displays multimedia information according to the teachings of embodiments of the present invention. Also, TV appliance 102 and/or server 104 are capable of receiving signals from a remote control and perform processing according to the signals.

If the interface is generated by server 104, server 104 may send the interface for display on TV systems 106 via communication network 108 or via communication network 108 and TV appliance 102. If the interface is generated by TV appliance 102, TV appliance 102 may send the interface for display on TV systems 106 through communication link 110. If the interface is generated by TV appliance 102 and server 104, TV appliance 102, server 104, or a combination thereof, may send the interface for display on TV systems 106. The interface generated by server 104 and/or TV appliance 102 enables the user to retrieve and browse multimedia information that may be stored in a multimedia document.

The processing performed by server system 104 and/or TV appliance 102 to generate the interface and to provide the various features according to the teachings of embodiments of the present invention may be implemented by software modules executing on server system 104 and/or TV appliance 102, by hardware modules coupled to server system 104 and/or TV appliance 102, or combinations thereof. In alternative embodiments of the present invention, the processing may also be distributed between the various systems depicted in FIG. 1.

The multimedia information that is displayed in the interface may be stored in a multimedia document that is accessible to server system 104 and/or TV appliance 102. For example, the multimedia document may be stored in a storage subsystem of server system 104 and/or TV appliance 102. Alternatively, the multimedia document may be stored in a memory location accessible to server system 104 and/or TV appliance 102.

Users may use TVs 106 to view the interface generated by server system 104 and/or TV appliance 102. Users may also use TV appliance 102 to interact with the other systems depicted in FIG. 1. For example, a user may use TV appliance 102 to select a particular multimedia document and request server system 104 and/or TV appliance 102 to generate an interface displaying multimedia information stored by the particular multimedia document. A user may also interact with the interface generated by server system 104 and/or TV appliance 102 using input devices coupled to TV appliance 102. TV appliance 102 may be of different types including a DVR, personal computer, a portable computer, a workstation, a computer terminal, a network computer, a mainframe, or any other data processing system.

According to an embodiment of the present invention, a single computer system may function both as server system 104 and as TV appliance 102. Various other configurations of the server system 104 and TV appliance 102 are possible.

Figure 2:
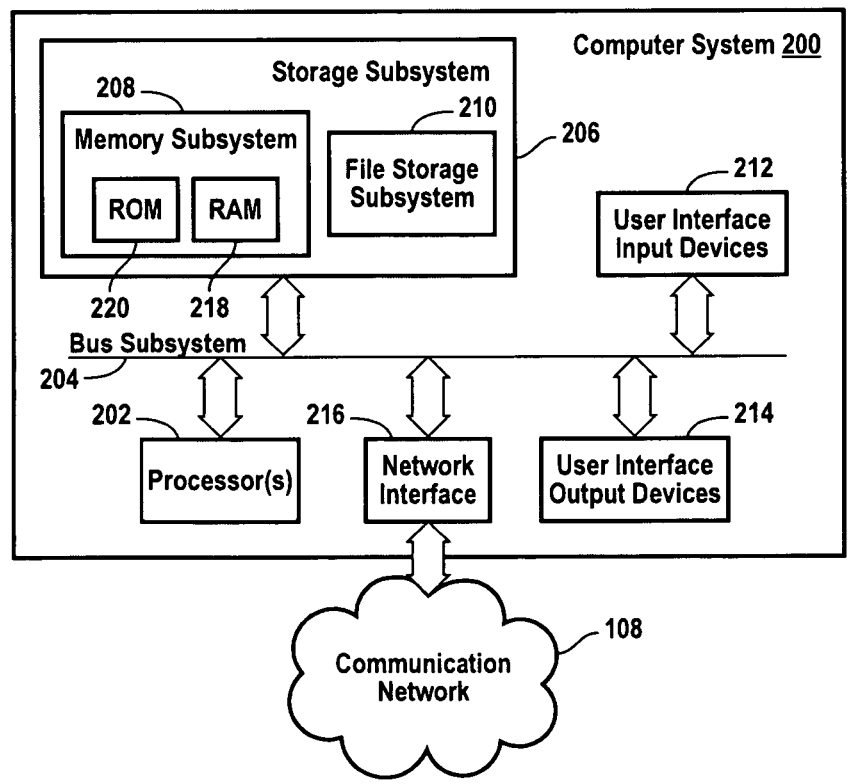
FIG. 2 is a simplified block diagram of a computer system according to an embodiment of the present invention.

FIG. 2 is a simplified block diagram of a computer system 200 according to an embodiment of the present invention. Computer system 200 may be used as any of the systems depicted in FIG. 1. As shown in FIG. 2, computer system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with computer system 200. A user may be a human user, a device, a process, another computer, or the like. Network interface subsystem 216 provides an interface to other computer systems and communication networks.

Bus subsystem 204 provides a mechanism for letting the various components and subsystems of computer system 200 communicate with each other as intended. The various subsystems and components of computer system 200 need not be at the same physical location but may be distributed at various locations within network 100. Although bus subsystem 204 is shown schematically as a single bus, alternative embodiments of the bus subsystem may utilize multiple busses.

User interface input devices 212 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 200. According to an embodiment of the present invention, the interface generated according to the teachings of the present invention may be presented to the user via output devices 214.

Storage subsystem 206 may be configured to store the basic programming and data constructs that provide the functionality of the computer system and of the present invention. For example, according to an embodiment of the present invention, software modules implementing the functionality of the present invention may be stored in storage subsystem 206 of server system 104. These software modules may be executed by processor(s) 202 of server system 104. In a distributed environment, the software modules may be stored on a plurality of computer systems and executed by processors of the plurality of computer systems. Storage subsystem 206 may also provide a repository for storing various databases that may be used by the present invention. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 200 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2.

Figure 3:
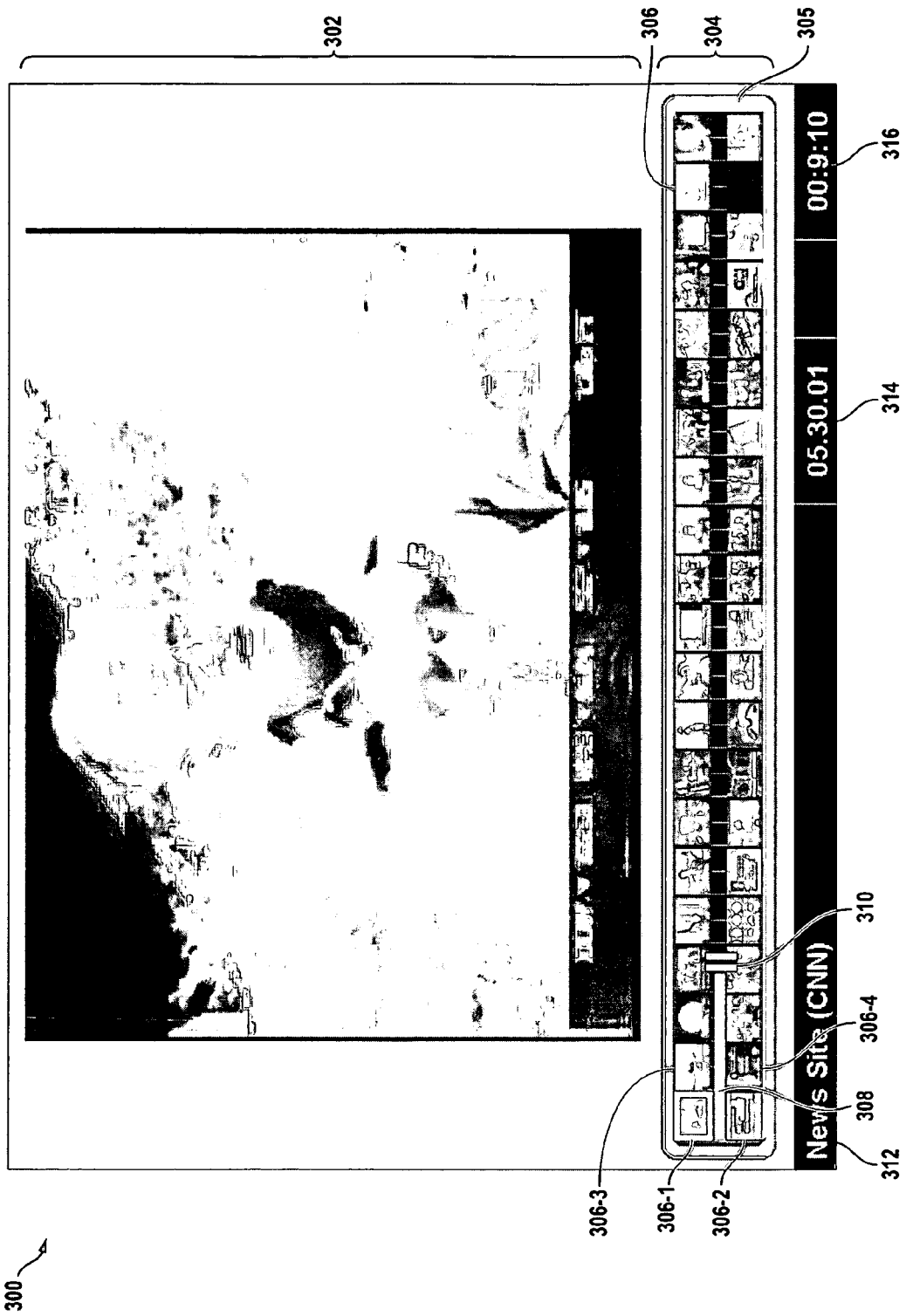
FIG. 3 illustrates a simplified television user interface for viewing multimedia information according to embodiment of the present invention.

FIG. 3 illustrates a simplified television user interface 300 for viewing multimedia information according to embodiment of the present invention. It will be apparent that interface 300 as depicted in FIG. 3 is merely illustrative of an embodiment incorporating the present invention and does not limit the scope of the invention as recited in the claims. One of ordinary skill in the art will recognize other variations, modifications, and alternatives.

According to an embodiment of the present invention, interface 300 is displayed on a TV and is used to output multimedia information. Interface 300 also comprises features that allow a user to control and navigate playback of the multimedia information output via TV 106. As shown, interface 300 includes a first viewing area 302 and a second viewing area 304. It will be apparent that alternative embodiments of the present invention may include more or fewer viewing areas than those depicted in FIG. 3. Further, in alternative embodiments of the present invention, one or more viewing areas may be combined into one viewing area, or a particular viewing area may be divided into multiple viewing areas. Accordingly, the viewing areas depicted in FIG. 3 and described below are not meant to restrict the scope of the present invention as recited in the claims.

As depicted in FIG. 3, interface 300 displays multimedia information corresponding to a television broadcast recording. A television broadcast may be stored as a television broadcast recording in a memory location accessible to server system 104 and/or TV appliance 102. It will be apparent that the present invention is not restricted to displaying television recordings. Other types of multimedia information that can be displayed via a TV interface, including other types of information, such as text information, closed-captioned (CC) text information, whiteboard information, or the like, may also be displayed in alternative embodiments of the present invention.

The multimedia information typically has a "start time" and an "end time". The start time denotes a time when recording of the multimedia information was started, and the end time denotes a time when recording of the multimedia information was stopped. The recorded multimedia information thus stores multimedia information between the start time and the end time. The time between the start time and the end time may be referred to as the duration of the multimedia information.

The television broadcast information that is output via interface 300 depicted in FIG. 3 may have been recorded using a variety of different techniques. According to one technique, the television broadcast is recorded and stored using a satellite receiver connected to a PC-TV video card of server system 104. Applications executing on server system 104 then process the recorded television broadcast to facilitate generation of interface 300. According to another embodiment of the present invention, the television broadcast may be captured using a digital video recorder. For example, a user may program a DVR to record a TV program on a particular channel. Examples of DVRs include devices TIVO™ systems, ReplayTV™ systems, set-top boxes, and the like.

First viewing area 302 outputs the multimedia information. As depicted in FIG. 3, multimedia information is being played back in first viewing area 302.

Second viewing area 304 displays a navigation bar 305 of the multimedia information being played back in first viewing area 302. As shown in FIG. 3, first viewing area 302 outputs multimedia information that may be stored in a multimedia document. Second viewing area 304 displays navigation bar 305 that is used to control navigation and playback of the information displayed in first viewing area 302. In one embodiment, navigation bar 305 displays a scaled representation of multimedia information being played in first viewing area 302. The user may select the scaling factor used for displaying information in navigation bar 305. According to a specific embodiment, a representation of the entire information (i.e., multimedia information between the start time and the end time associated with the playback of the multimedia information) is displayed in second viewing area 304. In this embodiment, one end of navigation bar 305 represents the start time of the multimedia video and the opposite end of navigation bar 305 represents the end time of the multimedia broadcast.

Navigation bar 305 displays a visual representation of multimedia information at certain times. Keyframes are extracted from the multimedia information in the multimedia document and displayed as thumbnail images in navigation bar 305. The thumbnail images may be used by a user to navigate the multimedia information. The user may use a remote control to select thumbnail images. Once a thumbnail image is selected, multimedia information being played back in first viewing area 302 is started at a time corresponding to the selected thumbnail image.

As shown in FIG. 3, according to one embodiment, navigation bar 305 includes one or more thumbnail images 306, a progress bar 308, and an action symbol 310. Each thumbnail image 306 represents a keyframe extracted from the stored multimedia information at a time. In the embodiment depicted in FIG. 3, the video information is displayed using video keyframes extracted from the video information included in the multimedia information stored by the multimedia document. The video keyframes may be extracted from the video information included in the multimedia document at various points in time between the start time and the end time.

A special layout style, which may be user configurable, is used to display the extracted thumbnail images 306 to enhance the readability of the thumbnail images. For example, a user may configure the thumbnail image height, thumbnail image width, width of navigation bar 305, and height of navigation bar 305. In FIG. 3, the thumbnail images are displayed such that two rows of thumbnail images are displayed.

One or more thumbnail images 306 may be displayed in navigation bar 305 based upon the different types of information included in the multimedia information being displayed. Although the thumbnail images displayed in second viewing area 304 depict keyframes extracted from the video information included in the multimedia information, it will be understood that in alternative embodiments of the present invention, the thumbnail images may be extracted from other types of information included in the multimedia information, such as text information, white board information, or the like. According to an embodiment of the present invention, the number of thumbnail images displayed in navigation bar 305 and the type of information represented by the thumbnail images is user configurable.

As depicted in FIG. 3, navigation bar 305 also includes a progress bar 308 that is displayed between the two rows of thumbnail images 306. The physical location of progress bar 308 indicates a time point in the multimedia document corresponding to the information being played back in first viewing area 302. In the embodiment depicted in FIG. 3, as multimedia information being displayed in first viewing area 302 is moving from an earlier time to a later time, progress bar 308 moves from left to right in navigation bar 305. Although progress bar 308 is shown in between the two rows of thumbnail images 306, it will be understood that progress bar 308 may be shown in different areas of interface 300. For example, progress bar 308 may be shown above the top row of thumbnail images 306, below the bottom row of thumbnail images 306, or in some other area.

Action symbol 310 shows the current state of playback of the multimedia information in first viewing area 302. As depicted in FIG. 3, the playback of multimedia information has been paused. As shown, a well known pause symbol is depicted as action symbol 310. Additionally, if the user is playing the multimedia information, action symbol 310 shows a standard triangle to represent a "play" mode. If the user is fast forwarding or rewinding the multimedia information, action symbol 310 shows a standard set of triangles depicted moving in a forward or reverse direction. These symbols are well known in the art and may be found on most TV, VCR, and DVD systems and remote controls.

Interface 300 may also include a title section 312, a date recorded section 314, and a current time section 316 in one embodiment. Title section 312 displays the title of the multimedia information being played back in first viewing area 302. Date recorded section 314 displays the date that the multimedia information being played back was recorded. Current time section 316 displays the current time in the multimedia information being played back.

As shown in FIG. 3, a thumbnail image 306-1 and thumbnail image 306-2 are situated on the top left and bottom left side of the navigation bar. Additionally, a thumbnail image 306-3 and a thumbnail image 306-4 are depicted next to thumbnail images 306-1 and 306-2, respectively. In one embodiment, thumbnail image 306-1 represents a keyframe extracted from the multimedia information at a first time t1. Also, thumbnail 306-2 is extracted from the multimedia information at a second time t2, where t2>t1, thumbnail image 306-3 is extracted from the multimedia information at a third time t3, where t3>t2, and thumbnail image 306-4 is extracted from the multimedia information at a fourth time t4, where t4>t3. Accordingly, the thumbnail images displayed in navigation bar 305 represent thumbnail images extracted from various times between the start time and end time of the multimedia information. It will be understood that thumbnail images 306 may be organized in various ways. For example, the progression of multimedia information may flow from left to right in the top row and then from left to right in the bottom row.

Figure 4:
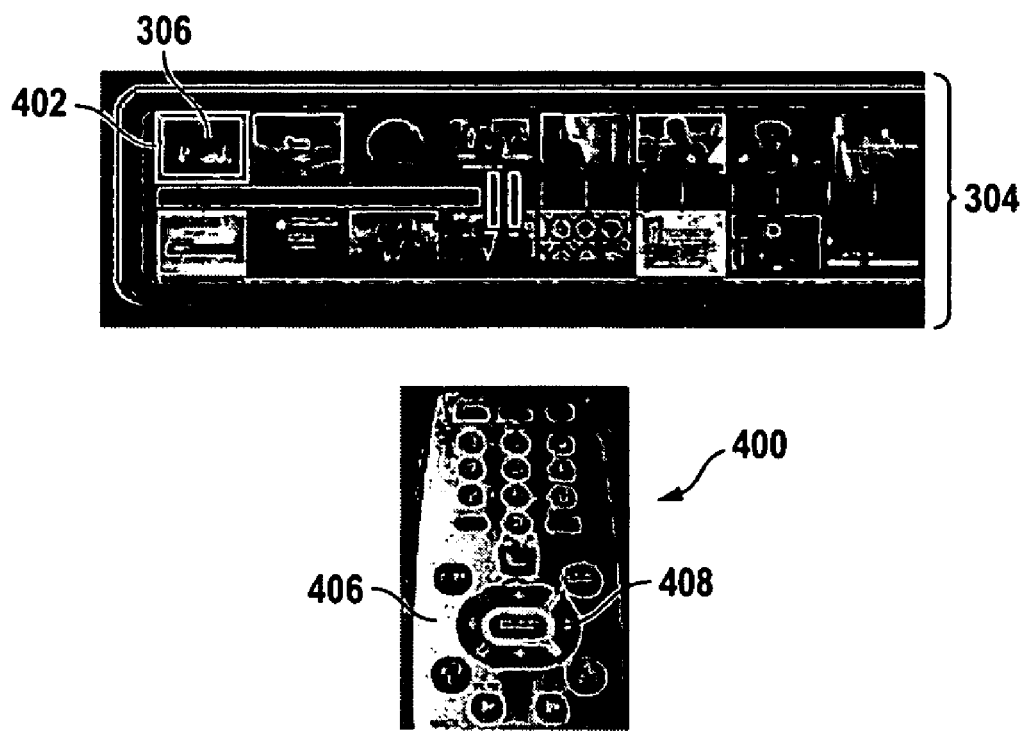
FIG. 4 illustrates a zoomed-in depiction of a second viewing area according to one embodiment.

FIG. 4 illustrates a zoomed-in depiction of second viewing area 304 according to one embodiment. Additionally, a remote control 400 for sending signals to server 104 and/or TV appliance 102 is shown. In one embodiment, remote control 400 may be used to stop, rewind, fast forward, or pause the multimedia information being played back in interface 300, or any other interfaced described. Additionally, remote control 400 is used to control a location box 402.

As depicted in FIG. 4, location box 402 is displayed in navigation bar 305. A user can navigate the multimedia information displayed in first viewing area 302 using location box 402. Location box 402 does not necessarily indicate where in the multimedia information being played back in first viewing area 302 is currently located in navigation bar 305. Instead, location box 402 indicates one or more thumbnail images 306 that a user may select with remote control 400. Movement of location box 402 over the thumbnail images 306 can be controlled using the up, down, left, or right buttons on remote control 400.

Although location box 402 is shown superimposed over one thumbnail image 306, location box 402 may encompass multiple thumbnail images 306 or a range of thumbnail images 306. If a range of thumbnail images 306 is selected, the multimedia information in between the first and last thumbnail image 306 selected may be played in first viewing area 302.

Remote control 400 may be any standard remote control able to communicate with server 104, TV appliance 102, and/or TV 106. According to an embodiment of the present invention, remote control 400 allows the user to control the TV 106 that is used to output the multimedia information. Remote control 400 may use infrared (IR) technology, wireless, wireline, or any other communication protocols in communicating commands to server 104 TV appliance 102, and/or TV 106. Remote control 400 may be embodied as a TV remote control, a DVD remote control, a VCR remote control, a personal digital assistant (PDA), a cellular phone, or the like. Remote control 400 may also be incorporated as part of a TV, DVR, DVD, VCR, and the like.

As shown, remote control 400 includes arrow buttons 406 that facilitate navigation of location box 402 in second viewing area 304. Arrow buttons 406 may be used to move location box 402 to different thumbnail images 306. Thus, when a right arrow key is pressed, location box 402 may move one thumbnail image 306 to the right, when a left arrow key is pressed, location box 402 may move one thumbnail image 306 to the left, and so on. The navigation of a navigation bar will described in more detail below. In one embodiment, each click of a button 406 moves the location box one thumbnail image position in the direction corresponding to the clicked button. In other embodiments, upon selection of a button 406, location box 402 may continuously move in the direction of the selected button until the user indicates (for example, by re-clicking the previously selected button on the remote control) that the movement of the location box should stop.

An enter button 408 is also provided on remote control 400. Enter button 408 is used to select a thumbnail image 306 corresponding (or presently emphasized) by location box 402. For example, if location box 402 is positioned over a particular thumbnail image 306 and the user then selects enter button 408, the particular thumbnail image is marked as selected by the user. An operation may then be performed on the selected thumbnail image. According to an embodiment of the present invention, when a particular thumbnail image 306 is selected by pressing enter button 408, the multimedia information being played back in first viewing area 302 jumps to a portion of the multimedia information in the multimedia document corresponding to the selected thumbnail image. For example, according to an embodiment of the present invention, playback of multimedia information in first viewing area 302 jumps to a section of the stored multimedia information corresponding to a timestamp associated with the selected keyframe. Further details on how timestamps are associated with thumbnail images will be described below.

Figure 5:
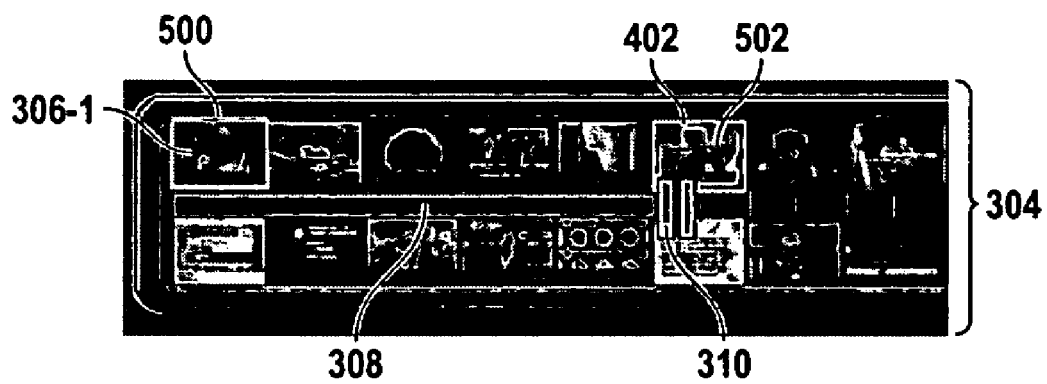
FIG. 5 depicts a zoomed-in display of a second viewing area according to one embodiment of the present invention.

FIG. 5 depicts a zoomed-in display of second viewing area 304 according to one embodiment of the present invention. A selected thumbnail image indicator 500 is included in second viewing area 304.

Selected thumbnail image indicators 500 are used to highlight one or more thumbnail images 306 that that have been previously selected by the user. Each selected thumbnail image indicator 500 is represented such that is visually distinct from and can be differentiated from location box 402. For example, according to an embodiment of the present invention, selected thumbnail image indicator 500 is displayed in a color that is different from the color used to represent location box 402. In FIG. 5, selected thumbnail image indicator 500 is shown by displaying a colored-rectangle around a border of a selected thumbnail image 306. It will be understood that many other indicators may be used to indicate selected thumbnail images. For example, a symbol may be displayed proximal to a selected thumbnail image.

As shown in FIG. 5, second viewing area 304 includes a selected thumbnail image corresponding to thumbnail image 306-1. As described above, according to an embodiment of the present invention, a user may have selected thumbnail image 306-1 using remote control 400. Upon selecting a particular thumbnail image (e.g. thumbnail image 306-1 depicted in FIG. 5), a selected thumbnail image indicator 500 is displayed highlighting thumbnail image 306-1 as a selected image. As shown, a rectangle has been displayed around thumbnail image 306-1 to highlight the image. As mentioned above, a selected thumbnail image indicator 500 (e.g., the rectangle) may be drawn using a different color than that used to denote location box 402. After selecting thumbnail image 306-1, the user can then move location box 402 to another thumbnail image (e.g., thumbnail image 502 depicted in FIG. 5).

Figure 6:
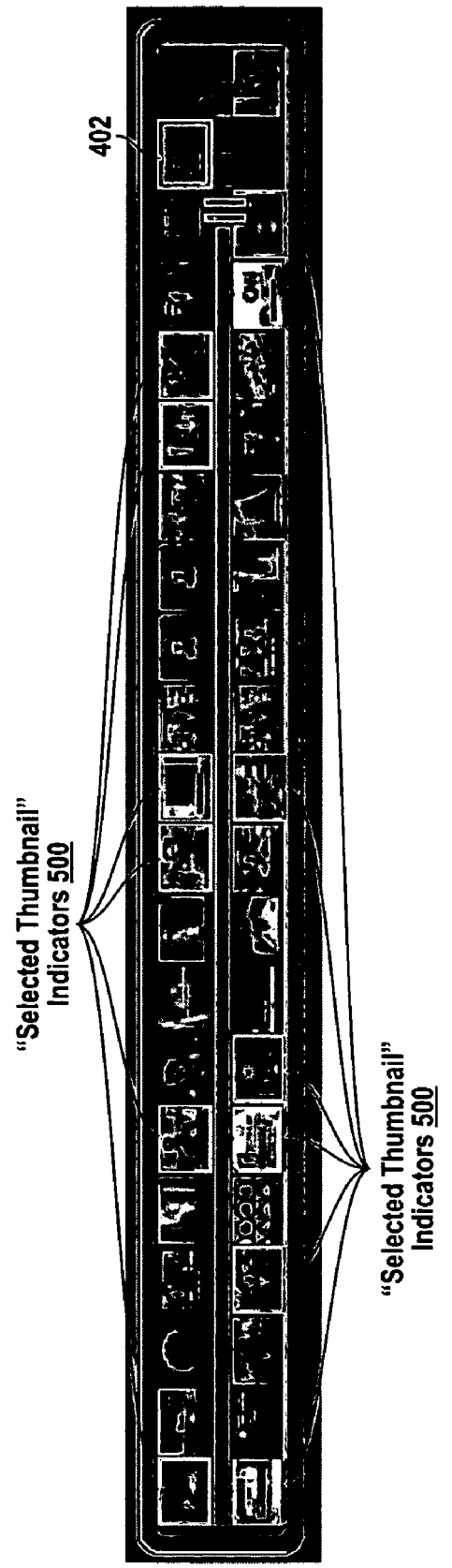
FIG. 6 depicts the second viewing area showing multiple selected thumbnail image indicators according to an embodiment of the present invention.

FIG. 6 depicts second viewing area 304 showing multiple selected thumbnail image indicators 500 according to an embodiment of the present invention.

As depicted in FIG. 6, multiple thumbnail images have been selected in second viewing area 304. Each selected image is indicated by a selected thumbnail image indicator 500. The selected thumbnail images represent various time points in the stored multimedia information that is displayed in first viewing area 302.

According to an embodiment of the present invention, the selected thumbnail images may be used for determining areas of the stored multimedia information that are of interest to the user. This information may also be used to generate a profile for a user where the profile indicates interests of the user. For example, if the user has selected one or more thumbnail images 306 that display images of "President George W. Bush", it may be inferred from the selected images that the user is interested in content related to "President George W. Bush". Additionally, if the user has selected thumbnail images 306 that correspond to sports-related content in the multimedia information, it may indicate that the user is interested in sports. Areas or topics of interest inferred from the selected thumbnail images may be used to generate a profile for the user. The user profile may be used to provide targeted advertising or targeted offers to the users. Targeted programming may also be offered to the user based upon the user's profile. For example, according to an embodiment of the present invention, if a user profile indicates that the user is interested in sports, then when the navigation bar is displayed to the user, all thumbnail images displayed in the navigation bar that correspond to sports-related content may be highlighted when displayed to the user via the TV interface.

Figure 7:
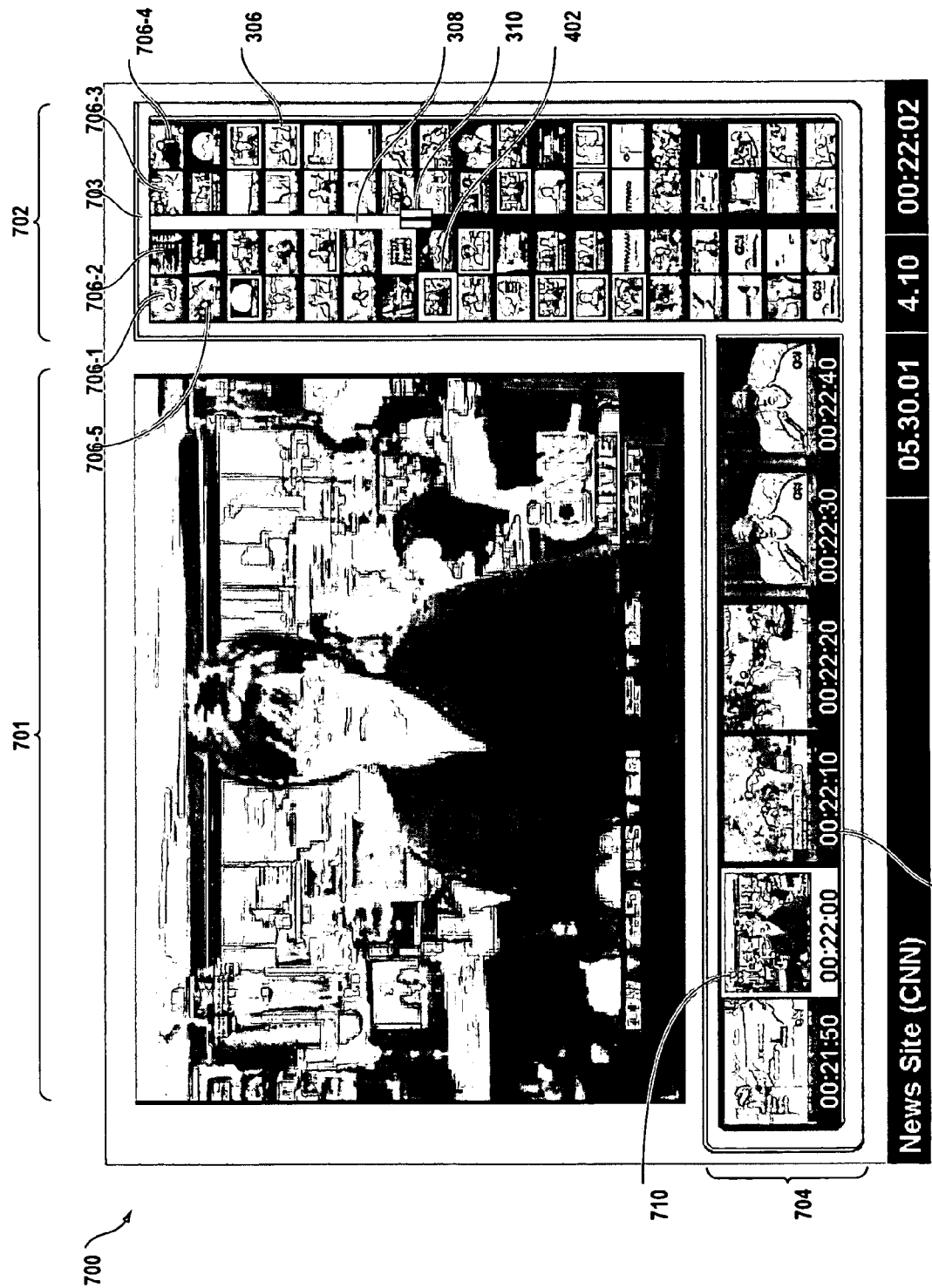
FIG. 7 depicts a TV user interface according to an embodiment of the present invention.

FIG. 7 depicts a TV user interface 700 according to an embodiment of the present invention. As shown, user interface 700 includes a first viewing area 701, a second viewing area 702, a navigation bar 703, and a preview area 704.

First viewing area 701 displays multimedia information from a multimedia document and is similar to first viewing area 302 described above.

Navigation bar 703 in second viewing area 702 includes thumbnail images 306 arranged vertically along the side of interface 700. In addition, progress bar 308, action symbol 310, selected thumbnail images indicators 500, and location box 402 are included in navigation bar 703. Accordingly, second viewing area 702 may include any of the features described above with reference to second viewing area 304. Second viewing area 702, however, displays thumbnail images 306 arranged in four vertical columns.

As shown, navigation bar 703 includes four columns of thumbnail images. The columns of thumbnail images are separated by progress bar 308 in one embodiment. It will be understood that progress bar 308 may be located in another area of second viewing area 702 or display 700.

As shown, a thumbnail image 706-1, a thumbnail image 706-2, a thumbnail image 706-3, and a thumbnail image 706-4 are situated in the top row of the four columns of navigation bar 703. In one embodiment, thumbnail image 706-1 represents a keyframe extracted from the multimedia information at a first time t1. Also, thumbnail 706-2 is extracted from the multimedia information at a second time t2, where t2>t1, thumbnail image 706-3 is extracted from the multimedia information at a third time t3, where t3>t2, and thumbnail image 706-4 is extracted from the multimedia information at a fourth time t4, where t4>t3. A thumbnail image 706-5 is then extracted from the multimedia information at a fifth time t5, where t5>t4, so on. Accordingly, the thumbnail images displayed in navigation bar 703 represent thumbnail images extracted from various times between the start time and end time of the multimedia information. It will be understood that thumbnail images 706 may be organized in various ways. For example, the progression of multimedia information may flow from the top of a column to the bottom of the column, to the top of the next column to the bottom of that column, and so on.

Preview area 704 includes thumbnail images 708 that are used to preview multimedia information from the multimedia document. In one embodiment, thumbnail images 708 displayed in preview area 704 represent keyframes extracted from multimedia information found at certain intervals proximal (both coming before and after) to a current location of the multimedia information being played in first viewing area 302. As shown, a current location thumbnail image 710 is displayed that corresponds to a current time in the multimedia information being played back in first viewing area 701. The keyframe displayed in current location thumbnail image 710 may not correspond to the exact time of the current location of multimedia information being played back in first viewing area 701, but may be the keyframe closest in time to the time of the current location among keyframes displayed in preview area 704.

In preview area 704, in one embodiment, current location thumbnail image 710 may be visually formatted to be distinct from other thumbnail images 708. For example, current location thumbnail image 710 may have its background highlighted in a different color. Additionally, a symbol may be displayed proximal to (e.g., next to, above, or below) current location thumbnail image 710. As shown, a time is displayed in current location thumbnail image 710 and also in other thumbnail images 708. The time corresponds to the time elapsed (i.e., time from the start time of the recorded multimedia information) in the multimedia information. Thumbnail images 708 are shown corresponding to multimedia information occurring at time 21:50, 00:22:00, 00:22:10, 00:22:20, 00:22:30, and 00:22:40 in the stored multimedia information.

The range time surrounding the current location of the multimedia information being played back may be user configurable. For example, a time period interval between thumbnail images 708 for the preview area 704 may be specified. Using the time period interval, times for extracting keyframes corresponding to the current location are calculated. Then, as described below, keyframes are extracted at calculated times and displayed as thumbnail images 708.

In an alternative embodiment, preview area 704 may include keyframes that are extracted in a time period interval corresponding to location box 402's position in navigation bar 703. In this case, when location box 402 is positioned over a particular thumbnail image 306, preview area 704 includes a number of keyframes extracted from intervals related in time to multimedia information corresponding to the position of the particular thumbnail image. The keyframes are then displayed in preview area 704 in the same manner as described above.

Figure 8:
FIG. 8 depicts a TV user interface according to an embodiment of the present invention.

FIG. 8 depicts a TV user interface 800 according to an embodiment of the present invention. As shown, interface 800 includes first viewing area 802 and a second viewing area 804 arranged vertically along the side of interface 800.

As shown in FIG. 8, second viewing area 804 includes a navigation bar 805 that includes two columns of thumbnail images 306 and a progress bar 806. Progress bar 806 is included to the side of thumbnail images 306. However, in other embodiments, progress bar 806 may be displayed in other areas of interface 800, such as to the right of thumbnail images 306.

An action symbol 808 is also included. As shown, action symbol 808 is offset to the left from progress bar 804. It will be understood that action symbol 806 is not limited to this position and may be located in other positions, such as being displayed on progress bar 806.

In one embodiment, topics of interests may be used to highlight thumbnail images in the above described interfaces. For example, if a user indicated a topic of interest, thumbnail images corresponding to that topic of interest may be highlighted. Topics of interest are described in U.S. patent application Ser. No. 10/001,895, filed on Nov. 19, 2001, entitled, "Automatic Adaptive Document Help System".

In one example, a user may select one or more topics of interests. In one embodiment, a topic of interest corresponds to one or more keyword phrases. Once one or more topics of interests are selected, the corresponding keyword phrases are used to search for the selected topics of interests in the multimedia information. For example, a keyword search for the keyword phrases is conducted in closed captioned material, or any text material in the multimedia information. When a keyword phrase is identified, the time in the multimedia information corresponding to the identified keyword phrase is determined. A thumbnail image being displayed in the navigation bar that has been extracted from a time closest to determined time is then highlighted.

Interface Generation Technique According to an Embodiment of the Present Invention The following section describes techniques for generating a navigation bar that is displayed on a TV interface according to an embodiment of the present invention. For purposes of simplicity, it is assumed that the multimedia information to be displayed in the interface comprises video information. However, it will be understood that other types of multimedia information, such as audio information, text information, whiteboard information, or the like, may also be included in the stored multimedia information and displayed on a TV interface in alternative embodiments of the present invention.

Figure 9:
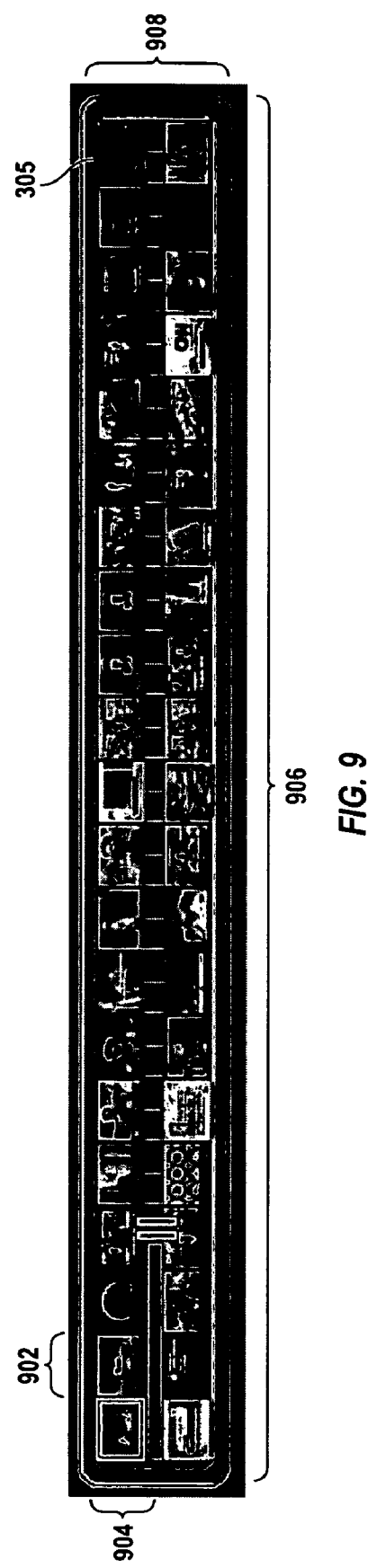
FIG. 9 depicts a navigation bar as displayed in FIG. 3 and dimensional variables that may be used to characterize the navigation bar according to an embodiment of the present invention.

FIG. 9 depicts navigation bar 305 in second viewing area 304 as displayed in FIG. 3 and dimensional variables that may be used to characterize navigation bar 305 according to an embodiment of the present invention. As depicted in FIG. 9, navigation bar 305 is characterized by imageContainerWidth and imageContainerHeight. Each thumbnail image displayed in the navigation bar is characterized by imageWidth and imageHeight dimensions. The stored multimedia information may be characterized by a duration variable.

The variable duration represents the length (in seconds) of the stored multimedia information (i.e., of the video information for purposes of explaining the simplified embodiment of the invention). Various different units may be used to measure the duration of the stored multimedia information including seconds, minutes, hours, or any other unit representative of time length.

ImageWidth 902 represents the width of an individual thumbnail image that may be displayed in the navigation bar. ImageHeight 904 represents the height of an individual thumbnail image that may be displayed in the navigation bar. ImageContainerWidth 906 represents the width of the area for displaying the navigation bar. ImageContainerHeight 908 represents the height of the area for displaying the navigation bar.

Figure 10:
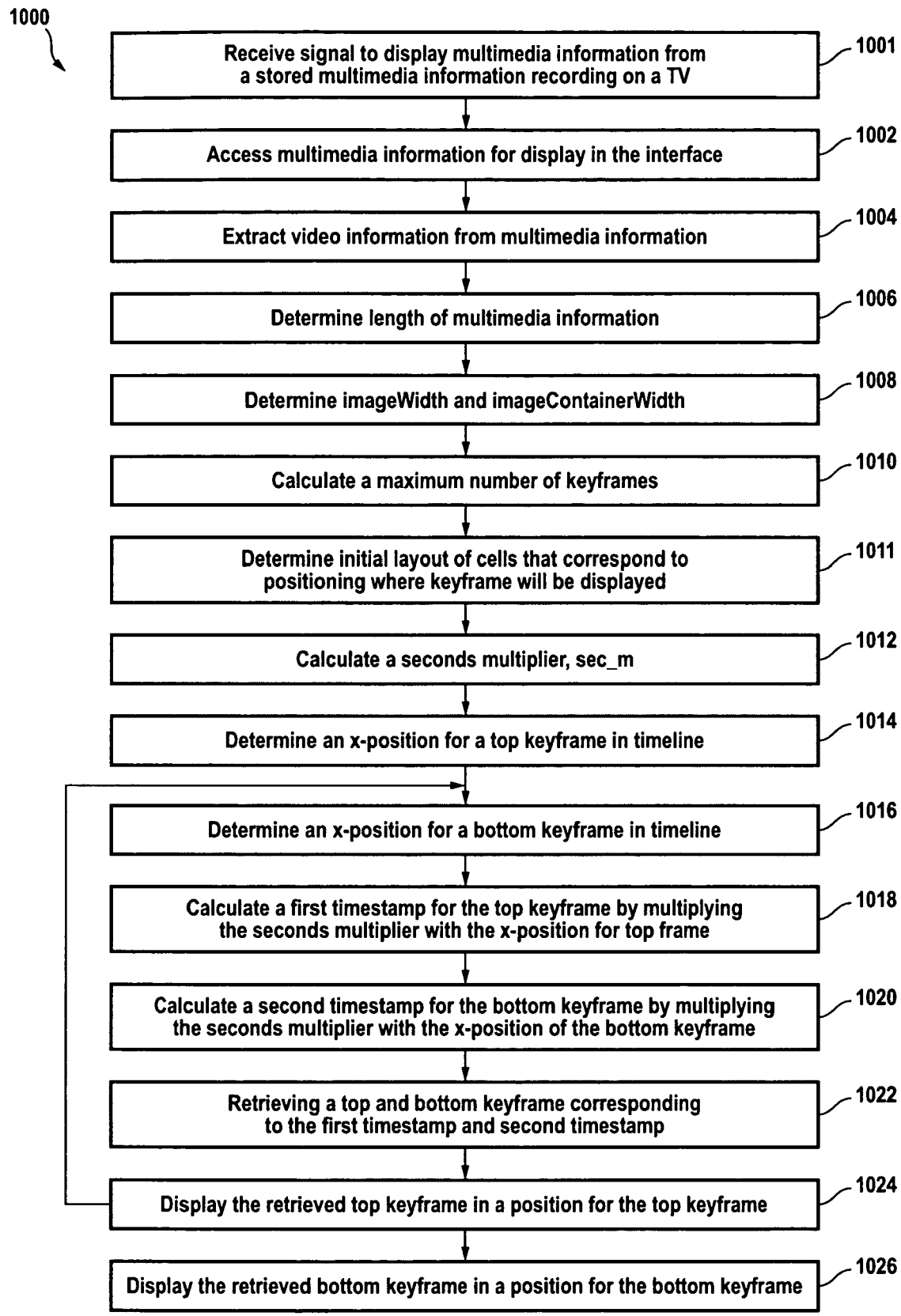
FIG. 10 is a simplified high-level flow chart depicting a method of displaying thumbnail images in a navigation bar according to an embodiment of the present invention.

FIG. 10 is a simplified high-level flow chart 1000 depicting a method of displaying thumbnail images (e.g., thumbnail images 306) in a navigation bar according to a layout depicted in FIG. 3, according to an embodiment of the present invention. The method depicted in FIG. 10 may be performed by server 104, by TV appliance 102, or by server 104 and TV appliance 102 in combination. For example, the method may be executed by software modules executing on server 104 or on TV appliance 102, by hardware modules coupled to server 104 or to TV appliance 102, or combinations thereof. In the embodiment described below, the method is performed by server 104. The method depicted in FIG. 10 is merely illustrative of an embodiment incorporating the present invention and does not limit the scope of the invention as recited in the claims. One of ordinary skill in the art would recognize other variations, modifications and alternatives.

As depicted in FIG. 10, server 104 receives a signal to display multimedia information from a stored multimedia information recording on a TV (step 1001). In response to the signal, server 104 then accesses multimedia information for display in the interface (step 1002). As previously stated, the multimedia information may be stored in a multimedia document accessible to server 104. As part of step 1002, server 104 may receive information (e.g., a file name of the multimedia document) identifying the multimedia document and the location (e.g., a directory path) of the multimedia document. The user of the present invention may provide the multimedia document identification information. Server 104 may then access the multimedia document based upon the provided information. Server system 104 then uses the stored document to generate the interface according to teachings of the embodiments of the present invention.

Server 104 then extracts video information from the multimedia information accessed in step 1002 (step 1004). In other embodiments, other information, such as text information, whiteboard information, or the like, may be extracted with or in place of the video information.

Server 104 then determines the length of the stored multimedia information (step 1006). In one embodiment, the length may be measured in seconds. The variable duration may be initialized to a value representing the length of the multimedia information.

The values for imageWidth and imageContainerWidth are then determined (step 1008). In one embodiment, the values may be predefined and retrieved from storage subsystem 206. Also, the values may be predefined and retrieved from any other system assessable to server 104.

Once the above values are determined, a maximum number of keyframes, maxKeyframes, is calculated (step 1010). The value maxKeyframes indicates how many keyframes may be displayed in a row of the navigation bar. For discussion purposes, two rows of thumbnail images will be assumed. In one embodiment, the calculation imageContainerWidth/imageWidth=maxKeyframes is used. In this calculation, the width of navigation bar is divided by the width of a thumbnail image. The value maxKeyframes indicates how many keyframes may be displayed in a row of the navigation bar.

Server 104 determines an initial layout of cells that correspond to positions in second viewing area 304 where thumbnail images will be displayed (step 1011). Each thumbnail is a keyframe extracted from the video information. The cells may be associated with a pixel location in second viewing area 304.

Server 104 determines a seconds multiplier, sec_m (step 1012). In one embodiment, the seconds multiplier may be determined by the calculation sec_m=duration/imageContainerWidth. Seconds multiplier, sec_m, is used to convert pixel locations in second viewing area 304 to a corresponding time value in seconds in the multimedia information.

Server 104 determines an X position in second viewing area 304 for a top keyframe that is associated with a cell position in the navigation bar (step 1014). The X position corresponds to a pixel location in interface 300. For example, the X position may be the position where thumbnail image 306-1 will be displayed on interface 300.

Server 104 determines an X position in second viewing area 304 for a bottom keyframe that is associated with a cell position in the navigation bar. In one embodiment, the top keyframe is a keyframe extracted at a time $T_X$ and the bottom keyframe is a keyframe extracted from the multimedia information at a time $T_Y$, where $T_Y > T_X$. The X position corresponds to a pixel location in interface 300. For example, the X position may be where thumbnail image 306-2 will be displayed on the interface.

In one embodiment, the X position for the bottom keyframe is calculated as the X position for the top keyframe in addition to half the value of the imageWidth value, which is half the width of a thumbnail image. It will be understood that other values may be used depending on the keyframe that is to be displayed in the bottom row. For example, the user may wish to display two keyframes that are close together and in this case, a smaller value than half the value of imageWidth may be used.

Figure 11:
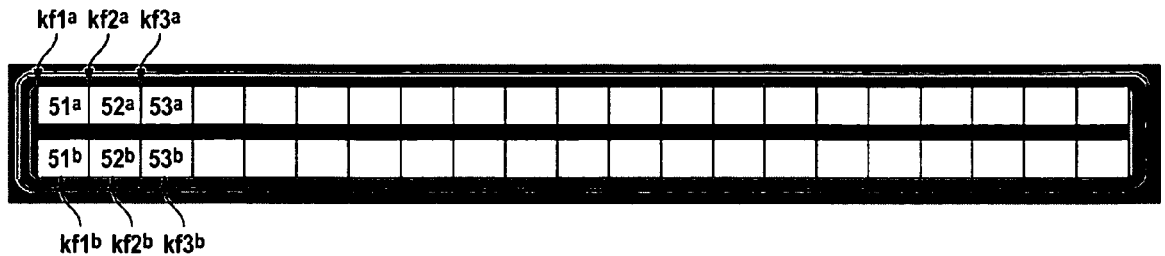
FIG. 11 shows possible X positions in the second viewing area according to one embodiment.

Referring to steps 1014 and 1016, FIG. 11 shows possible X positions in second viewing area 304 according to one embodiment. As shown, X positions for the top row keyframes are represented by $KF1^a$, $KF2^a$, and $KF3^a$. The X position calculated for a particular thumbnail image corresponds to upper-left hand coordinate for displaying the particular thumbnail image in the navigation bar. X positions for bottom keyframes are denoted by $KF1^b$, $KF2^b$, and $KF3^b$. The X position for the bottom keyframes corresponds to a position in the middle of each thumbnail image.

Referring back to FIG. 10, server 104 then calculates a first timestamp for the top row keyframe by multiplying the seconds multiplier, sec_m, with the X position for the top row keyframe (step 1018). This calculation associates a time in the multimedia information with an X position on the navigation bar. As the X position value increases, the timestamp associated with the X position also increases. Accordingly, each increasing X position value represents a later time point in the stored multimedia information.

Server 104 then calculates a second timestamp for the bottom keyframe by multiplying the second multiplier, sec_m, with the X position of the bottom key frame (step 1020). In one embodiment, the X position of the bottom keyframe is the X position of the top keyframe plus half the width of the value of imageWidth. Accordingly, the second timestamp for the bottom keyframe will be for a later time than the timestamp for the top keyframe.

Server 104 retrieves, from the multimedia document, a top row and bottom row keyframe corresponding to the first and second timestamps calculated as described above (step 1022). Using the value of the first and second timestamps, which correspond to a time in the multimedia information, top and bottom keyframes are extracted that are closest in time to the timestamps.

A retrieved top row keyframe is then displayed in the corresponding cell position for the top row keyframe (step 1024). The retrieved bottom row keyframe is also displayed in the corresponding cell position for the bottom row keyframe (step 1026). The process then reiterates to step 1014, where X positions for top row and bottom row keyframes for corresponding cell positions are determined, new timestamps are calculated, and top row and bottom row keyframes are retrieved for the new timestamps and displayed in the navigation bar at the corresponding cell positions.

In one embodiment, a cell corresponding to each thumbnail image 306 is an object, such as a JAVA object, including the coordinate information (X position), the keyframe, and the timestamp.

Figure 12:
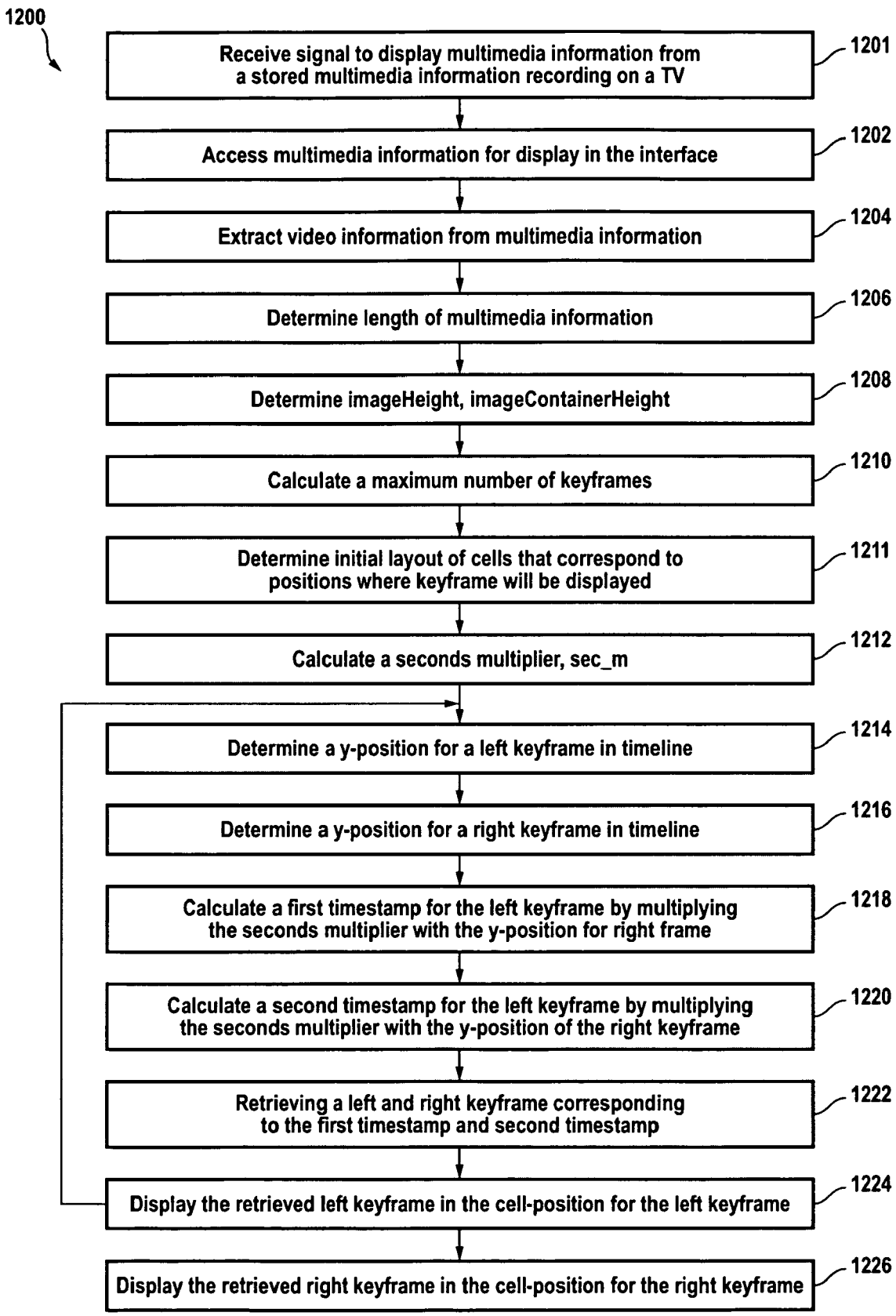
FIG. 12 is a simplified high-level flow chart depicting a method of displaying thumbnail images in a navigation bar according to an embodiment of the present invention.

FIG. 12 is a simplified high-level flow chart 1200 depicting a method of displaying thumbnail images, such as thumbnail images 306, in a navigation bar according to the layout depicted in FIG. 7 or 8. The method depicted in FIG. 12 may be performed by server 104, by TV appliance 102, or by server 104 and TV appliance 102 in combination. For example, the method may be executed by software modules executing on server 104 or on TV appliance 102, by hardware modules coupled to server 104 or to TV appliance 102, or combinations thereof. In the embodiment described below, the method is performed by server 104. The method depicted in FIG. 12 is merely illustrative of an embodiment incorporating the present invention and does not limit the scope of the invention as recited in the claims. One of ordinary skill in the art would recognize other variations, modifications and alternatives.

For discussion purposes, the generation of navigation bar 805 will be described. In this method, the navigation bar is displayed vertically instead of horizontally. Thus, a different seconds multiplier, sec_m, is used that corresponds to duration/ImageContainerHeight. Also, the Y axis position is used to calculate the keyframes to retrieve and imageHeight is used to determine the right column keyframe to extract.

As depicted in FIG. 12, server 104 receives a signal to display multimedia information from a stored multimedia information recording on a TV (step 1201). In response to the signal, server 104 then accesses multimedia information for display in the interface (step 1202). As previously stated, the multimedia information may be stored in a multimedia document accessible to server 104. As part of step 1202, server 104 may receive information (e.g., a file name of the multimedia document) identifying the multimedia document and the location (e.g., a directory path) of the multimedia document. The user of the present invention may provide the multimedia document identification information. Server 104 may then access the multimedia document based upon the provided information.

Server 104 then extracts video information from the multimedia information accessed in step 1202 (step 1204). In other embodiments, other information, such as text information, whiteboard information, or the like, may be extracted with or in place of the video information.

Server 104 determines the length of the multimedia information. In one embodiment, the length may be measured in seconds (step 1206). The variable duration may be initialized to a value representing the length of the multimedia information.

The values for imageHeight and imageContainerHeight are then determined (step 1208). In one embodiment, the values may be predefined and retrieved from storage subsystem 206. Also, the values may be predefined and retrieved from any other system assessable to server 104.

Once the above values are determined, a maximum number of keyframes, maxKeyframes, is calculated (step 1210). The value maxKeyframes indicates how many keyframes may be displayed in a column on the navigation bar. For discussion purposes, two columns of thumbnail images will be assumed. In one embodiment, the calculation imageContainerHeight/imageHeight=maxKeyframes is used. In this calculation, the height of navigation bar is divided by the height of a thumbnail image. The value maxKeyframes indicates how many keyframes may be displayed in a column of the navigation bar.

Server 104 determines an initial layout of cells that correspond to positions in the second viewing area where thumbnail images will be displayed (step 1211). Each thumbnail is a keyframe extracted from the video information. The cells may be associated with a pixel location in second viewing area 804.

Server 104 determines a seconds multiplier, sec_m (step 1212). In one embodiment, the seconds multiplier may be determined by the calculation sec_m=duration/imageContainerHeight. Seconds multiplier, sec_m, is used to convert pixel locations in the second viewing area to a corresponding time in seconds in the multimedia information.

Server 104 determines an Y position in second viewing area 804 for a left keyframe that corresponds to a cell position in the navigation bar (step 1214). The Y position corresponds to a pixel location in the second viewing area. For example, the Y position may be the position where thumbnail image in the left column will be displayed on the interface.

Server 104 determines an Y position in the second viewing area for a right keyframe that corresponds to a cell position in the navigation bar (step 1216). In one embodiment, the left keyframe is a keyframe extracted at a time $T_X$ and the right keyframe is a keyframe extracted from the multimedia information at a time $T_Y$, where $T_Y > T_X$. The Y position corresponds to a pixel location in the second viewing area. For example, the Y position may be where a thumbnail image in the right column will be displayed on the interface.

In one embodiment, the Y position for the right keyframe is calculated as the Y position for the left keyframe in addition to half the value of the imageHeight value, which is half the height of a thumbnail image. It will be understood that other values may be used depending on the keyframe that is to be displayed in the right column. For example, the user may wish to display two keyframes that are close together and in this case, a smaller value than half the value of imageHeight may be used.

Figure 13:
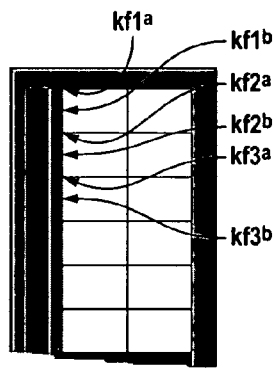
FIG. 13 shows possible Y positions in a second viewing area according to one embodiment.

Referring to steps 1214 and 1216, FIG. 13 shows possible Y positions in second viewing area 804 according to one embodiment. As shown, an Y position for the left column keyframes $KF1^a$, $KF2^a$, and $KF3^a$ are shown. The Y position corresponds to an upper left-hand coordinate of the display of thumbnail images. Additionally, the Y position for right column keyframes $KF1^b$, $KF2^b$, and $KF3^b$ is shown. The Y position for the right keyframes corresponds to a position in the middle of each thumbnail image 306 in the left column.

Referring back to FIG. 12, server 104 then calculates a first timestamp for the left column keyframe by multiplying the seconds multiplier, sec_m, with the Y position for the left row keyframe (step 1218). This calculation associates a time in the multimedia information with an Y position on the navigation bar. Thus, as the Y position increases, the timestamp also increases correspondingly and multimedia information later in the multimedia document is displayed as the Y position increases.

Server 104 then calculates a second timestamp for the right keyframe by multiplying the second multiplier, sec_m, with the Y position of the right key frame (step 1020). In one embodiment, the Y position of the right keyframe is the Y position of the left keyframe plus half the height of the value of imageHeight. Accordingly, the second timestamp for the right keyframe will be for a later time than the timestamp for the left keyframe.

Server 104 retrieves, from the multimedia document, a left and right keyframe corresponding to the first and second timestamps calculated as described above (step 1222). Using the value of the first and second timestamps, which correspond to a time in the multimedia information, left and right keyframes are extracted from a time closest in time to the timestamps.

A retrieved left keyframe is then displayed in the corresponding cell position for the left keyframe (step 1224). The retrieved right keyframe is also displayed in the corresponding cell position for the right keyframe (step 1226). The process then reiterates to step 1214, where Y positions for left and right keyframes that correspond to cell positions are determined, new timestamps are calculated, and left and right keyframes are retrieved for the new timestamps and displayed in the navigation bar at their corresponding cell positions.

In one embodiment, a cell corresponding to each thumbnail image 306 is an object, such as a JAVA object, including the coordinate information (Y position), the keyframe, and the timestamp.

It will be understood that any number of rows or columns may be included in a navigation bar. In order to determine the X or Y axis position of each keyframe in the navigation bar, a different increment is calculated depending on the number of rows or columns. In one embodiment, for a vertical navigation bar, such as found in FIG. 7, an increment is equal to the variable imageHeight divided by the number of columns. The increment in FIG. 7 would be imageHeight divided by 4. Keyframes would then be extracted at each increment along the Y axis. The same process may be used if more than two rows of thumbnail images are to be included in a navigation bar. However, the variable imageWidth is divided by the number of rows and the increment is used along the X axis.

One example according to FIG. 10 will now be described. In this example, the multimedia information is a video that is one hour long. Thus, the value for duration=3600. Also, it is assumed that imageContainerWidth=760, imageWidth=36, and imageHeight=26. For one row of keyframes, the maximum number of keyframes is maxKeyframes=imageContainerWidth/imageWidth=760/36=21. Thus, 21 keyframes may be displayed from left to right on the horizontal axis. Assuming there are two rows of keyframes, such as found in FIG. 3, 42 key frames in total will be displayed. Additionally, the ordering of keyframes is from top to bottom, and left to right, as explained above.

The second multiplier, sec_m is calculated as sec_m equals duration/imageContainerWidth=3600/760=4.7368. The X positions are then determined for thumbnail images 306. For example, if the following X positions are used, $KF1^a=0$, $KF1^b=18$; $KF2^a=36$, $KF2^b=54$; and $KF3^a=72$, $KF3^b=90$, the corresponding timestamp values are $S1^a=0$, $S1^b=85.26$; $S2^a=170.52$, $S2^b=255.78$; and $S3^a=341.04$, $S3^b=426.31$. The timestamps are calculated by multiplying the seconds multiplier sec_m by the X position.

Using the calculated timestamp for each corresponding position in the navigation bar, server 104 then retrieves a keyframe closest to that time and displays it in the navigation bar.

An example according to the method described in FIG. 12 will now be described. In this example, imageHeight=26, imageContainerHeight=540, and imageWidth=36.

The seconds multiplier is different in this example because the height of the navigation bar is different. Thus, second multiplier, sec_m=duration/imageContainerHeight=3600/540=6.6667.

Assuming the Y position values are $KF1^a=0$, $KF1^b=13$; $KF2^a=26$, $KF2^b=39$; and $KF3^a=52$, $KF3^b=65$, the corresponding timestamps are equal to $S1^a=0$, $S1^b=86.67$; $S2^a=173.33$, $S2^b=260$; and $S3^a=346.67$, $S3^a=433.33$. As described above, the timestamps are calculated as sec_m multiplied by the Y position.

Using the calculated timestamp for each corresponding position in the navigation bar, server 104 then retrieves a keyframe closest to that time and displays it in the navigation bar.

Figure 14:
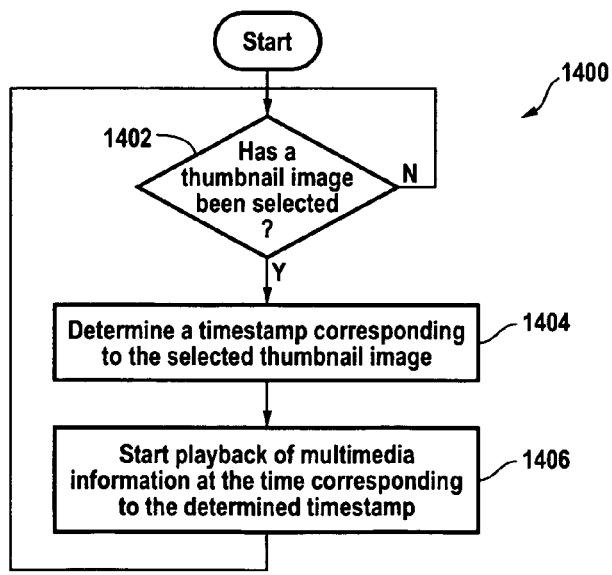
FIG. 14 is a simplified high-level flow chart illustrating a method for starting playback of multimedia information corresponding to a selected thumbnail image according to an embodiment of the present invention.

FIG. 14 illustrates a simplified high-level flow chart 1400 illustrating a method for starting playback of multimedia information corresponding to a selected thumbnail image according to an embodiment of the present invention. The method depicted in FIG. 14 is merely illustrative of an embodiment incorporating the present invention and does not limit the scope of the invention as recited in the claims. One of ordinary skill in the art would recognize other variations, modifications and alternatives.

Server 104 determines if a thumbnail image has been selected (e.g., if a thumbnail in the navigation bar has been highlighted by location box 402 and the "enter" button has been selected (step 1402). If not, the method reiterates to step 1402, where server 104 determines whether a thumbnail image has been selected again.

If a thumbnail has been selected, server 104 determines a timestamp corresponding to the selected thumbnail image (step 1404). According to an embodiment of the present invention, the timestamp corresponding to the selected thumbnail image represents the timestamp associated with the cell in the navigation bar in which the thumbnail image is displayed. The timestamp associated with the selected thumbnail image is then used to reposition playback of the multimedia information displayed in the first viewing area.

Server 104 then starts playback of multimedia information at the time corresponding to the determined timestamp in the first viewing area (step 1406). In this case, the playback starts at a position in the stored multimedia information corresponding to the determined timestamp and continues thereon. The process then reiterates to step 1402, where server 104 monitors for another selected image.

The navigation of the navigation bar will now be described according to one embodiment. In one embodiment, a remote control, such as remote control 400 depicted in FIG. 4, may be used to navigate or change the location of location box 402 in the navigation bar. As described above, arrow buttons 408 may be used to move location box 402 to different locations in the navigation bar.

As mentioned above, a request signal may be received to move location box in the up, down, left, or right locations. Upon receiving the signal, server 104 determines if the requested movement is feasible and moves the location box accordingly. The manner in which the request is handled may depend upon the type and layout (e.g., a navigation bar in which the thumbnails are displayed horizontally or vertically, etc.) of the navigation bar displayed on the TV.

Assuming the navigation bar of FIG. 3 is used, if the signal requested moving the location box in a down direction, the location box is moved down from the first row of thumbnails to the second row of thumbnails to a thumbnail image immediately below the current location of location box 402 in the first row. If the signal requested moving the location box in a right direction, the location box is moved to a thumbnail image in the column next (right of) to the current location of location box 402. Additionally, if the signal requested moving location box 402 to the left, location box 402 is moved to a column to left of the current position of location box 402. A move is considered not feasible if the location bar has been moved to its limit in any particular direction and a signal is received to further move the location bar in the particular direction. For example, if location box 402 is positioned over a thumbnail in the leftmost corner, then a request to move the location box to the left is not feasible and would yield no movement at all.

If location box 402 is located in the bottom row of the navigation bar, a request to move location box down will cause location box 402 to be moved to the top row of a column next to the current location of location box 402. The reasoning behind moving location box 402 to the next column is that the user decides to move location box 402 to a later time. Also, a request to move location box up will cause location box 402 to be moved to the bottom row of a column to the left of the current location of location box 402, if possible.

In the case of a vertically aligned navigation bar, a request to move right would move down the navigation bar row by row until it reached the bottom. Also a request to move in the left direction, would go back up the navigation bar until it reached the top. Additionally, up and down requests are processed as described above.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for displaying a multimedia document on a television display, the multimedia document being stored on a storage system as a file, the method comprising:
   retrieving the multimedia document from the storage system;
   displaying a section of multimedia information comprising the multimedia document in a first area of the display;
   displaying a navigation bar in a second area of the display, the navigation bar including a plurality of thumbnail images and a progress bar image representative of a total playing time of the multimedia information, wherein the thumbnail images are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;
   displaying a location box on the navigation bar, the location box associated with at least one thumbnail image in the thumbnail images;
   receiving input from a user indicative of selection of a selected thumbnail image, including, receiving user input to move the location box from a first position associated with a first thumbnail image to a second position associated with the selected thumbnail image; and
   in response to selection of the selected thumbnail image, displaying in the first area of the display a section of the multimedia information at a point in time corresponding to the selected thumbnail image, including displaying the location box in the second position associated with the selected thumbnail image.

2. The method of claim 1, wherein at least one of the thumbnail images is selectable during playback of the multimedia information in the first area of the display.

3. The method of claim 1, wherein the at least one thumbnail image is selectable using a television remote control.

4. The method of claim 1, wherein the progress bar comprises a symbol related to the playback of the multimedia information in the first area of the display, wherein the symbol comprises at least one of a pause sign, a play sign, a rewind sign, and a fast forward sign.

5. The method of claim 1, further comprising receiving user input for selecting the at least one thumbnail image.

6. The method of claim 5, further comprising displaying an indication that the selected at least one thumbnail has been selected.

7. The method of claim 6, wherein the indication is a highlighted location box including the selected at least one thumbnail.

8. The method of claim 1, further comprising displaying a second navigation bar in a third area of the display, the second navigation bar including one or more preview thumbnail images.

9. The method of claim 8, wherein the preview thumbnail images are extracted from the multimedia information in an interval related to a current time of the section of multimedia information being displayed in the first viewing area.

10. The method of claim 1, wherein the multimedia information comprises video information.

11. The method of claim 1, wherein a thumbnail image in the plurality of thumbnail images is a keyframe of multimedia information.

12. The method of claim 1, further comprising:
   receiving topic of interest information;
   determining one or more thumbnail images related to the topic of interest information from one or more thumbnail images; and
   displaying a visual indication with the determined one or more thumbnail images that are related to the topic of interest.

13. A method for displaying a multimedia document on a television display, the multimedia document being stored on a storage system as a file, the method comprising:
   retrieving the multimedia document from the storage system;
   displaying a section of multimedia information contained in the multimedia document in a first area of the display;
   displaying a navigation bar in a second area of the display, the navigation bar including a plurality of keyframes and a progress bar image representative of a total playing time of the multimedia information, wherein the keyframes are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;
   displaying a location box on the navigation bar, the location box associated with at least one keyframe in the keyframes;
   receiving input from a user indicative of selection of a selected keyframe, including, receiving user input to move the location box from a first position associated with a first keyframe to a second position associated with the selected keyframe; and
   in response to selection of the selected keyframe, displaying in the first area of the display a section of the multimedia information at a point in time corresponding to the selected keyframe, including displaying the location box in the second position associated with the selected keyframe,
   wherein displaying a navigation bar includes:
      identifying a second area of the display in which the navigation bar will be displayed;
      determining one or more timestamps based on the second area of the display and the length of time of the multimedia document;
      for each timestamp, selecting a keyframe from the multimedia information of the multimedia document using time information associated with said each timestamp as a basis for selecting said keyframe;
      configuring the navigation bar, the navigation bar including keyframes extracted for said each timestamp; and displaying the configured navigation bar in the second area of the display, wherein at least one keyframe included in the navigation bar is selectable by a user while the section of multimedia information in the first area of the display is being displayed.

14. The method of claim 13, wherein at least one keyframe is selectable during playback of the multimedia information in the first area of the display.

15. The method of claim 13, wherein the at least one keyframe is selectable using a television remote control.

16. The method of claim 13, wherein determining one or more timestamps comprises determining a seconds multiplier.

17. The method of claim 16, wherein determining the seconds multiplier comprises dividing a length of the multimedia information by a width of the second area of the display.

18. The method of claim 16, wherein determining the seconds multiplier comprises dividing a length of the multimedia information by a height of the second area of the display.

19. The method of claim 16, wherein determining the one or more timestamps comprises multiplying the seconds multiplier by one or more positions in the second area of the display.

20. The method of claim 19, wherein the one or more positions are one or more X axis positions in the second area of the display.

21. The method of claim 19, wherein the one or more positions are one or more Y axis positions in the second area of the display.

22. The method of claim 13, wherein determining one or more timestamps comprises:
determining a timestamp for a first keyframe at a first position in the second area of the display; and
determining a timestamp for a second keyframe at a second position in the second area of the display,
wherein the second position is greater than the first position.

23. The method of claim 22, wherein determining one or more timestamps comprises:
determining a timestamp for a third keyframe at a third position in the second area of the display,
wherein the second position is greater than the first position but less than the third position.

24. The method of claim 13, wherein the second area of the display includes one or more cell positions.

25. The method of claim 24, wherein the keyframe extracted for the one or more timestamps are displayed in the one or more cell positions.

26. The method of claim 13, wherein the progress bar comprises a symbol related to the playback of the multimedia information in the first area of the display, wherein the symbol comprises at least one of a pause sign, a play sign, a rewind sign, and a fast forward sign.

27. The method of claim 13, further comprising receiving user input for selecting the at least one keyframe.

28. The method of claim 27, further comprising in response to the user input selecting the at least one keyframe, displaying a section of the multimedia information at a time corresponding to the selected at least one keyframe in the first area of the display.

29. The method of claim 27, further comprising displaying an indication that the selected at least one keyframe has been selected.

30. The method of claim 29, wherein the indication is a highlighted location box including the selected at least one keyframe.

31. The method of claim 13, further comprising displaying a second navigation bar in a third area of the display, the second navigation bar including one or more preview keyframes.

32. The method of claim 31, wherein the preview keyframes are extracted from the multimedia information in an interval related to a current time of the section of multimedia information being displayed in the first viewing area.

33. The method of claim 13, wherein the multimedia information comprises video information.

34. The method of claim 13, further comprising:
receiving topic of interest information;
determining one or more keyframes in the navigation bar related to the topic of interest information; and
displaying a visual indication with the determined one or more keyframes that are related to the topic of interest.

35. A data processing system for displaying a multimedia document on a television display, the data processing system comprising:
a processor;
a data storage system for storing a plurality of data files, the multimedia document being one of the data files;
a memory coupled to the processor, the memory configured to store one or more code modules for execution by the processor, the one or more code modules comprising:
a module for retrieving the multimedia document from the data storage system;
a module for displaying a section of multimedia information comprising the multimedia document in a first area of the display;
a module for displaying a navigation bar in a second area of the display, the navigation bar including a plurality of thumbnail images and a progress bar image representative of a total playing time of the multimedia information, wherein the thumbnail images are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display, wherein when a user selects a selected thumbnail image, then the section of the multimedia information that is being displayed in the first area of the display starts from a point in time corresponding to the selected thumbnail image;
a module for displaying a location box on the navigation bar, the location box associated with at least one thumbnail image in the thumbnail images;
a module for receiving input from a user indicative of selection of a selected thumbnail image, including, a module for receiving user input to move the location box from a first position associated with a first thumbnail image to a second position associated with the selected thumbnail image; and
a module for displaying, in response to selection of the selected thumbnail image, in the first area of the display a section of the multimedia information at a point in time corresponding to the selected thumbnail image, including displaying the location box in the second position associated with the selected thumbnail image.

36. The data processing system of claim 35, wherein at least one of the thumbnail images is selectable during playback of the multimedia information in the first area of the display.

37. The data processing system of claim 35, wherein the at least one thumbnail image is selectable using a television remote control.

38. The data processing system of claim 35, further comprising a module for displaying a second navigation bar in a third area of the display, the second navigation bar including one or more preview thumbnail images.

39. A data processing system for displaying a multimedia document on a television display, the data processing system comprising:
 a processor;
 a data storage system for storing a plurality of data files, the multimedia document being one of the data files;
 a memory coupled to the processor, the memory configured to store one or more code modules for execution by the processor, wherein the one or more code modules comprising:
 a module for retrieving the multimedia document from the data storage system;
 a module for displaying in a first area of the display a section of multimedia information comprising the multimedia document;
 a module for displaying a navigation bar in a second area of the display, the navigation bar including a plurality of keyframes and a progress bar image representative of a total playing time of the multimedia information, wherein the keyframes are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;
 a module for displaying a location box on the navigation bar, the location box associated with at least one keyframe in the keyframes;
 a module for receiving input from a user indicative of selection of a selected keyframe, including, a module for receiving user input to move the location box from a first position associated with a first keyframe to a second position associated with the selected keyframe; and
 a module for displaying, in response to selection of the selected keyframe, in the first area of the display a section of the multimedia information at a point in time corresponding to the selected keyframe, including displaying the location box in the second position associated with the selected keyframe,
 wherein the module for displaying displaying a navigation bar includes:
 a module for identifying a second area of the display in which the navigation bar will be displayed;
 a module for determining one or more timestamps based on the second area of the display and the length of time of the multimedia document;
 a module for selecting, for each timestamp, a keyframe from the multimedia information of the multimedia document using time information associated with said each timestamp as a basis for selecting said keyframe;
 a module for configuring the navigation bar, the navigation bar including keyframes extracted for said each timestamp; and
 a module for displaying the configured navigation bar in the second area of the display, wherein at least one keyframe included in the navigation bar is selectable while the section of multimedia information in the first area of the display is being displayed.

40. The data processing system of claim 39, wherein at least one keyframe is selectable during playback of the multimedia information in the first area of the display.

41. The data processing system of claim 39, wherein the at least one keyframe is selectable using a television remote control.

42. The data processing system of claim 39, wherein determining one or more timestamps comprises determining a seconds multiplier.

43. The data processing system of claim 42, wherein determining the one or more timestamps comprises multiplying the seconds multiplier by one or more positions in the second area of the display.

44. The data processing system of claim 39, wherein the module for determining one or more timestamps comprises:
 a module for determining a timestamp for a first keyframe at a first position in the second area of the display; and
 a module for determining a timestamp for a second keyframe at a second position in the second area of the display,
 wherein the second position is greater than the first position.

45. The data processing system of claim 44, wherein the module for determining one or more timestamps comprises:
 a module for determining a timestamp for a third keyframe at a third position in the second area of the display,
 wherein the second position is greater than the first position but less than the third position.

46. A system comprising
 a television;
 a data storage system for storing a plurality of data files;
 a data processing system, wherein the data processing system is configured to:
 obtain a multimedia document stored on the data storage system;
 display a section of multimedia information in a first area of the display, the multimedia information comprising the multimedia document;
 display a navigation bar in a second area of the display, the navigation bar including a plurality of thumbnail images and a progress bar image representative of a total playing time of the multimedia information, wherein the thumbnail images are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display, wherein when a user selects a selected thumbnail image, then the multimedia information that is being displayed in the first area of the display starts from a point in time corresponding to the selected thumbnail image;
 display a location box on the navigation bar, the location box associated with at least one thumbnail image in the thumbnail images;
 receive input from a user indicative of selection of a selected thumbnail image, including, receiving user input to move the location box from a first position associated with a first thumbnail image to a second position associated with the selected thumbnail image; and
 display, in response to selection of the selected thumbnail image, in the first area of the display a section of the multimedia information at a point in time corresponding to the selected thumbnail image, including displaying the location box in the second position associated with the selected thumbnail image.

47. The system of claim 46, wherein at least one thumbnail image in the thumbnail images is selectable during playback of the multimedia information in the first area of the display.

48. The system of claim 46, wherein the at least one thumbnail image is selectable using a television remote control.

49. A system comprising
a television;
a data storage system for storing a plurality of data files, the multimedia document being one of the data files;
a data processing system, wherein the data processing is configured to:
retrieve the multimedia document from the data storage system;
display a section of multimedia information from a multimedia document in a first area of the display;
display a navigation bar in a second area of the display, the navigation bar including a plurality of keyframes and a progress bar image representative of a total playing time of the multimedia information, wherein the keyframes are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;
display a location box on the navigation bar, the location box associated with at least one keyframe in the keyframes;
receive input from a user indicative of selection of a selected keyframe, including, receive user input to move the location box from a first position associated with a first keyframe to a second position associated with the selected keyframe; and
in response to selection of the selected kevframe, display in the first area of the display a section of the multimedia information at a point in time corresponding to the selected keyframe, including displaying the location box in the second position associated with the selected keyframe,
wherein to display the navigation bar, the data processing is configured to:
identify a second area of the display in which the navigation bar will be displayed;
determine one or more timestamps based on the second area of the display and the length of time of the multimedia document;
for each timestamp, selecting a keyframe from the multimedia information of the multimedia document using time information associated with said each timestamp as a basis for selecting said keyframe;
configure the navigation bar, the navigation bar including keyframes extracted for said each timestamp; and
display the configured navigation bar in the second area of the display, wherein at least one keyframe included in the navigation bar is selectable while the section of multimedia information in the first area of the display is being displayed.

50. The system of claim 49, wherein at least one keyframe is selectable during playback of the multimedia information in the first area of the display.

51. The system of claim 49, wherein the at least one keyframe image is selectable using a television remote control.

52. A system for displaying a multimedia document on a television display, the system comprising:
a processing unit, the processing unit including:
means for displaying a section of multimedia information comprising the multimedia document in a first area of the display;
means for displaying a navigation bar in a second area of the display, the navigation bar including a plurality of thumbnail images and a progress bar image representative of a total playing time of the multimedia information, wherein the thumbnail images are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display, wherein when a selected thumbnail image is selected by a user, then the section of the multimedia information that is being displayed in the first area of the display starts from a point in time corresponding to the selected thumbnail image;
means for receiving input from a user indicative of selection of a selected thumbnail image, including:
means for displaying a location box on the navigation bar, the location box associated with at least one thumbnail image in the thumbnail images; and
means for receiving user input to move the location box from a first position associated with a first thumbnail image to a second position associated with the selected thumbnail image; and
means for displaying, in response to selection of the selected thumbnail image, in the first area of the display a section of the multimedia information at a point in time corresponding to the selected thumbnail image, including displaying the location box in the second position associated with the selected thumbnail image.

53. A system for displaying a multimedia document on a television display, the multimedia document being stored on a storage system as a file, the system comprising:
a data processing unit, the data processing unit including:
means for retrieving the multimedia document from the storage system;
means for displaying a section of multimedia information contained in the multimedia document in a first area of the display;
means for displaying a navigation bar in a second area of the display, the navigation bar including a plurality of keyframes and a progress bar image representative of a total playing time of the multimedia information, wherein the keyframes are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;
means for displaying a location box on the navigation bar, the location box associated with at least one keyframe in the keyframes;

means for receiving input from a user indicative of selection of a selected keyframe, including, means for receiving user input to move the location box from a first position associated with a first keyframe to a second position associated with the selected keyframe; and means for displaying, in response to selection of the selected keyframe, in the first area of the display a section of the multimedia information at a point in time corresponding to the selected keyframe, including displaying the location box in the second position associated with the selected keyframe, wherein the means for displaying a navigation bar includes:

means for identifying a second area of the display in which the navigation bar will be displayed;

means for determining one or more timestamps based on the second area of the display and the length of time of the multimedia document;

means for selecting, for each timestamp, a keyframe from the multimedia information of the multimedia document using time information associated with said each timestamp as a basis for selecting said keyframe;

means for configuring the navigation bar, the navigation bar including keyframes extracted for said each timestamp; and means for displaying the configured navigation bar in the second area of the display, wherein at least one keyframe included in the navigation bar is selectable while the section of multimedia information in the first area of the display is being displayed.

54. A computer program product for displaying a multimedia document on a television display, the multimedia document being stored on a storage system as a file, the computer program product comprising:

a storage subsystem having stored thereon executable program code, the executable program code including:

code for retrieving the multimedia document from the storage system;

code for displaying a section of multimedia information comprising the multimedia document in a first area of the display; and code for displaying a navigation bar in a second area of the display, the navigation bar including a plurality of thumbnail images and a progress bar image representative of a total playing time of the multimedia information, wherein the thumbnail images are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display, wherein when a selected thumbnail image is selected by the user, then the section of the multimedia information that is being displayed in the first area of the display starts from a point in time corresponding to the selected thumbnail image;

code for displaying a location box on the navigation bar, the location box associated with at least one thumbnail image in the thumbnail images;

code for receiving input from a user indicative of selection of a selected thumbnail image, including code for receiving user input to move the location box from a first position associated with a first thumbnail image to a second position associated with the selected thumbnail image; and code for displaying, in response to selection of the selected thumbnail image, in the first area of the display a section of the multimedia information at a point in time corresponding to the selected thumbnail image, including displaying the location box in the second position associated with the selected thumbnail image.

55. The computer program product of claim 54, wherein at least one thumbnail image in the one or more thumbnail images is selectable during playback of the multimedia information in the first area of the display.

56. The computer program product of claim 54, wherein the at least one thumbnail image is selectable using a television remote control.

57. A computer program product for displaying a multimedia document on a television display, the multimedia document being stored on a storage system as a file, the computer program product comprising:

a storage subsystem having stored thereon executable program code, the executable program code including:

code for retrieving the multimedia document from the storage system;

code for displaying a navigation bar in a second area of the display, the navigation bar including a plurality of keyframes and a progress bar image representative of a total playing time of the multimedia information, wherein the keyframes are extracted from the multimedia information at substantially equal intervals of time between the beginning and end of the multimedia information, wherein the progress bar image includes a symbol displayed at a position on the progress bar image indicative of a time corresponding to the section of the multimedia information being displayed in the first area of the display;

code for displaying a location box on the navigation bar, the location box associated with at least one keyframe in the keyframes;

code for receiving input from a user indicative of selection of a selected keyframe, including, code for receiving user input to move the location box from a first position associated with a first keyframe to a second position associated with the selected keyframe; and code for displaying, in response to selection of the selected keyframe, in the first area of the display a section of the multimedia information at a point in time corresponding to the selected keyframe, including displaying the location box in the second position associated with the selected keyframe, wherein the code for displaying a navigation bar includes:

code for displaying a section of multimedia information comprising the multimedia document in a first area of the display;

code for identifying a second area of the display in which the navigation bar will be displayed;

code for determining one or more timestamps based on the second area of the display and the length of time of the multimedia document;

code for selecting, for each timestamp, a keyframe from the multimedia information of the multimedia document using time information associated with said each timestamp as a basis for selecting said keyframe; keyframes extracted for said each timestamp; and code for displaying the configured navigation bar in the second area of the display, wherein at least one keyframe included in the navigation bar is selectable while the section of multimedia information in the first area of the display is being displayed.

58. The computer program product of claim 57, wherein at least one keyframe is selectable during playback of the multimedia information in the first area of the display.

59. The computer program product of claim 57, wherein the at least one keyframe is selectable using a television remote control.

* * * * *